US012164656B2

(12) United States Patent
Rognlie et al.

(10) Patent No.: US 12,164,656 B2
(45) Date of Patent: Dec. 10, 2024

(54) DYNAMIC BATCH LIMIT VALIDATION

(71) Applicant: ID Business Solutions, Inc., Alameda, CA (US)

(72) Inventors: Brent Robert Rognlie, Westminster, CO (US); Joseph David Ruth, Louisville, CO (US); Kenneth Andrew Forman, Louisville, CO (US)

(73) Assignee: ID Business Solutions, Inc., Alameda, CA (US)

( * ) Notice: Subject to any disclaimer, the term of this patent is extended or adjusted under 35 U.S.C. 154(b) by 305 days.

(21) Appl. No.: 17/414,633

(22) PCT Filed: Dec. 20, 2019

(86) PCT No.: PCT/US2019/068002
§ 371 (c)(1),
(2) Date: Jun. 16, 2021

(87) PCT Pub. No.: WO2020/132537
PCT Pub. Date: Jun. 25, 2020

(65) Prior Publication Data
US 2022/0050907 A1 Feb. 17, 2022

Related U.S. Application Data

(60) Provisional application No. 62/782,920, filed on Dec. 20, 2018, provisional application No. 62/876,990, filed on Jul. 22, 2019.

(51) Int. Cl.
*G06F 21/62* (2013.01)
(52) U.S. Cl.
CPC ................................ *G06F 21/6209* (2013.01)
(58) Field of Classification Search
CPC .................................................. G06F 21/6209
See application file for complete search history.

(56) References Cited

U.S. PATENT DOCUMENTS 7,383,071 B1 * 6/2008 Russell .............. A61B 5/14539
600/348
2002/0082787 A1 * 6/2002 Woodworth ....... G08B 13/2462
702/81

(Continued)

FOREIGN PATENT DOCUMENTS

| JP | 2007172290 A | 7/2007 |
| WO | 2004036472 A1 | 4/2004 |
| WO | 2015187802 A1 | 12/2015 |

OTHER PUBLICATIONS

International Search Report and Written Opinion issued in International Patent Application No. PCT/US2019/068002 on May 20, 2020 (12 pages).

(Continued)

*Primary Examiner* — Vance M Little
(74) *Attorney, Agent, or Firm* — PATENT LAW WORKS LLP

(57) ABSTRACT

The present disclosure relates generally to systems and methods for validating data, such as data related to testing or sampling a batch of a product, with a data compliance tracking system. An exemplary method includes receiving at least one data point from a computing element, wherein the data point corresponds to data collected from a sampling of at least one parameter during a batch run of a product and includes time stamp data; determining limit information corresponding to the at least one parameter, wherein the limit information includes at least one limit associated with at the least one parameter and has an associated valid value range; storing the at least one data point and the limit information; receiving an analytics request from a user device; analyzing the stored limit information to apply a limit to a select data point; and displaying an analytics output.

17 Claims, 32 Drawing Sheets

(56) References Cited

U.S. PATENT DOCUMENTS

| | | | |
|---|---|---|---|
| 2002/0095982 A1* | 7/2002 | Weissmann | G01F 17/00 |
| | | | 73/149 |
| 2005/0055242 A1 | 3/2005 | Bello et al. | |
| 2005/0246045 A1* | 11/2005 | Sugihara | G06Q 10/06 |
| | | | 700/109 |
| 2007/0050070 A1* | 3/2007 | Strain | G06Q 10/06 |
| | | | 700/99 |
| 2007/0057789 A1* | 3/2007 | Hamerly | G06Q 50/04 |
| | | | 340/572.1 |
| 2007/0183926 A1* | 8/2007 | Tanoshima | G01N 35/00594 |
| | | | 422/65 |
| 2008/0038833 A1 | 2/2008 | Popp | |
| 2009/0198465 A1* | 8/2009 | Decker | G05B 19/402 |
| | | | 702/84 |
| 2012/0095582 A1* | 4/2012 | Chen | G06Q 10/06 |
| | | | 700/103 |
| 2015/0269507 A1* | 9/2015 | Ascano | G06Q 10/0639 |
| | | | 705/7.38 |
| 2018/0285887 A1* | 10/2018 | Maung | G06Q 30/018 |

OTHER PUBLICATIONS

European Extended Search Report in Application 19900433.4, mailed Jan. 28, 2022, 8 pages.

PCT International Preliminary Report on Patentability in International Application PCT/US2019/068002, mailed Jul. 1, 2021, 9 pages.

Japanese Office Action issued for JP application No. 2021-536326 on Jan. 29, 2024, 4 pgs.

Communication Pursuant to Article 94(3) EPC issued from European Patent Office for EP application No. 19900433.4-1203 on Apr. 15, 2024, 7 pgs.

Response to Office Action for Japanese Patent Application No. 2021-536326, filed Sep. 10, 2024, 7 pgs.

* cited by examiner

DATA POINT STORAGE

| | 272 | 278 |
|---|---|---|
| 276 | TEMPERATURE | TIME |
| 275a | 5.2° C | 1:55PM 2/6/18 |
| 275b | 5.3° C | 11:06PM 3/1/18 |
| 275c | 5.5° C | 3:04PM 5/3/18 |
| 275d | 5.5° C | 12:26PM 8/22/18 |
| 275e | 4.8° C | 4:54PM 10/22/18 |
| 275f | 5.0° C | 10:38AM 4/4/19 |
| 275g | 5.0° C | 1:46PM 8/21/19 |

LIMIT STORAGE

270 ↙

| | 280 / 274 | 286 / 282 | 284 |
|---|---|---|---|
| | VALID INTERVAL | MIN. | MAX. |
| 285a | 1/1/18 – 3/3/18 | 4.5° C | 5.5° C |
| 285b | 3/4/18 – 6/4/18 | 4.4° C | 5.4° C |
| 285c | 6/5/18 – 7/15/18 | 4.3° C | 5.3° C |
| 285d | 7/16/18 – 10/21/18 | 4.6° C | 5.6° C |
| 285e | 10/22/18 – 12/1/18 | 4.8° C | 5.7° C |
| 285f | 12/2/18 – 3/4/19 | 4.5° C | 5.5° C |
| 285g | 3/5/19 – 5/6/19 | 4.5° C | 5.2° C |
| 285h | 5/7/19 – 8/22/19 | 4.0° C | 5.2° C |

306 — TARGET CONTROL LIMITS

PROCESS LIMITS ▾    BATCHES    ANALYTICS ▾

> EXPANSION
  > WCB
  ∨ SF

| PARAMETER NAME | VALID FROM | LIMIT CATERGORIES | STA |
|---|---|---|---|
| VCC (x10⁶ cells/mL) | JAN-18-2018 | | CUR |
| DURATION (HOURS) | MAY-27-2016 | | CUR |
| VIABILITY (%) | APR-28-2018 | | CUR |

> WB
> N-1
∨ PROD
  > ⊞ TEMP PROBE
> INPUTS
  > CULTURE
  > HARV

EXPANSION < SF    ✕

*PARAMETER
[VCC          ∨]  — 310

SUB-PRODUCT
[             ∨]  — 372

MARKET
[             ∨]  — 374

*VALID FROM
[DEC-05-2018  ]   — 376

VALID THROUGH
[             ]   — 378

UCL            LCL
[5     ✕]  [     ]

UWL            LWL
[3.5    ]  [     ]

UIL            LIL
[       ]  [     ]

CANCEL                    SAVE DRAFT  SUBMIT

306 — TARGET CONTROL LIMITS

394 — ☐ OBSOLETE  ☑ CURRENT  ☑ FUTURE  ☑ DRAFT  ☑ PENDING  ☑ REJECTED

PROCESS  LIMITS▾  BATCHES  ANALYTICS▾  ⊙

☰ CAMBRIDGE-A-MAB

[APPLY]

> EXPANSION

> N-1

> PROD

> HARVEST

> PRO A

∨ V1

| PARAMETER NAME | 376 — VALID FROM | 374 — LIMIT CATERGORIES | 394 — STATUS | 382 — VALUES |
|---|---|---|---|---|
| 310 — pH | 09-OCT-2017 | | CURRENT ⊖ | Mean:5 ST Std dev:3 |

> CEX

> AEX

> VF

> UF/DF

304 — SPECIFICATION LIMITS

| | | | | |
|---|---|---|---|---|
| > EXPANSION | | | | ... |
| > N-1 | | | | ... |
| ∨ PROD | | | | |
|   > INPUTS | | | | ... |
|   ∨ CULTURE | | | | ... |
|     > PROCESS | | | | ... |
|     > IPC | | | | ... |
|   > HARV | | | | ... |
| ∨ BDS | | | | ... |
| PARAMETER NAME | VALID FROM (376) | LIMIT CATEGORIES (374) | STATUS (394) | VALUES (382) |
| AGGREGATES (%) | 01-OCT-2018 | MARKET: EU | CURRENT | RELEASE: <=3.0 |
| AGGREGATES (%) | 01-OCT-2018 | MARKET: USA | OBSOLETE | RELEASE: <=2.0 |
| AGGREGATES (%) | 30-NOV-2018 | MARKET: USA | CURRENT | RELEASE: <=2.5 |

BASEL-A-MAB    PROCESS    LIMITS▾    BATCHES    ANALYTICS▾

BATCH>PROD>MAB_020 (16-NOV-2018 15:13)
75 mg/mL vial, USA

METADATA APPROVED

PROCESS
TEMP
23.1 ⌄ °C
pH
6.92 ⌄
MAX pCO2
106 ⌄ mmHg
PEAK VCC
26.3 ⌄ x10⁶ cells/mL IPC
AFUCOSYLATION
8.4 ⌄ %
GALACTOSE
25.2 ⌄ %
MANNOSE
3.16 ⌄ %
SIALIC ACID
0.28 ⌄ %
NON-G HC BATCH ID
MAB_020
BATCH DATE
16-NOV-2018 15:13
STATISTICAL OUTLIER
NO
COMMENTS
SUB-PRODUCT
75 mg/mL vial
MARKET
USA
REFERENCE URLs
ATTACHMENTS
STATUS
APPROVED
LAST SAVED BY
JOHN DOE
LAST SAVED ON
18-NOV-2018 00:40
LAST SUBMITTED BY
JOHN DOE
LAST SUBMITTED ON
18-NOV-2018 00:40

≡ CAMBRIDGE-A-MAB     HOME   PROCESS LIMITS▾   BATCHES   ANALYTICS▾   ⊙    ✕

PROCESS DEFINITION — 774

> EXPANSION

∨ N-1 — 776     N-1 — 780    782

DEFINITION   ANALYTICS   ALERTS — 778

INDIVIDUALS CHART

| PARAMETER NAME | UNIT OF MEASURE | PARAMETER CLASSES |
|---|---|---|
| FINAL VCC | x10⁶ cells/mL | KPA |
| VCC SPLIT | | KPP |
| DURATION | DAYS | KPP |
| VIABILITY | % | KPA |
| SGR | DAYS⁻¹ | CPP |

KenRule — 788
- RULE 1  1 POINT ABOVE/BELOW THE CONTROL LIMITS  ☐
- RULE 2  2 OF 3 POINTS IN A ROW ABOVE/BELOW THE WARNING LIMITS  ☐
- RULE 3  2 OF 3 POINTS IN A ROW ABOVE/BELOW THE INNER LIMITS  ☐
- RULE 4  5 POINTS IN A ROW ON SAME SIDE OF CENTERLINE  ☐
- RULE 5  5 POINTS IN A ROW INCREASING OR DECREASING  ☐

MR CHART — 790
1 POINT ABOVE/BELOW THE CONTROL LIMITS  ☐

LIMIT METHOD
SELECT ▸

STANDARD DEVIATION LIMIT
SELECT ▸

SPECIFICATION LIMIT 1 — 786
SELECT ▸ — 794

SPECIFICATION LIMIT 2
SELECT ▸

[ SAVE ]  CANCEL

> PROD

∨ INPUTS

| PARAMETER NAME | UNIT OF MEASURE | PARAMETER CLASSES |
|---|---|---|
| ANTIFOAM LOT | | CMA |
| OSMO | mOsm/Kg | WC-CPP |

∨ CULTURE

| PARAMETER NAME | UNIT OF MEASURE | PARAMETER CLASSES |
|---|---|---|
| GF TIME | HOURS | KPP |
| DURATION | DAYS | WC-CPP |

≡ CAMBRIDGE-A-MAB     HOME   PROCESS LIMITS▾   BATCHES   ANALYTICS▾   ⊙

PROCESS DEFINITION

> EXPANSION

∨ N-1    764

| PARAMETER NAME | UNIT OF MEASURE | PARAMETER CLASSES |
|---|---|---|
| FINAL VCC | x10⁶ cells/mL | KPA |
| VCC SPLIT | | KPP |
| DURATION | DAYS | KPP |
| VIABILITY | % | KPA |
| SGR | DAYS⁻¹ | CPP |

∨ PROD

∨ INPUTS

| PARAMETER NAME | UNIT OF MEASURE | PARAMETER CLASSES |
|---|---|---|
| ANTIFOAM LOT | | CMA |
| OSMO | mOsm/Kg | WC-CPP |

∨ CULTURE

| PARAMETER NAME | UNIT OF MEASURE | PARAMETER CLASSES |
|---|---|---|
| GF TIME | HOURS | KPP |
| DURATION | DAYS | WC-CPP |

N-1    780    ✕

DEFINITION   ANALYTICS   ALERTS

- RULE 1: 1 POINT ABOVE/BELOW THE CONTROL LIMITS ☐
- RULE 2: 2 OF 3 POINTS IN A ROW ABOVE/BELOW THE WARNING LIMITS ☐
- RULE 3: 2 OF 3 POINTS IN A ROW ABOVE/BELOW THE INNER LIMITS ☐
- RULE 4: 5 POINTS IN A ROW ON SAME SIDE OF CENTERLINE ☐
- RULE 5: 5 POINTS IN A ROW INCREASING OR DECREASING ☐

MR CHART

1 POINT ABOVE/BELOW THE CONTROL LIMITS

LIMIT METHOD

| TARGET MEAN +/- CONTROL LIMIT VALUES ▾ |
| STANDARD DEVIATION LIMIT |
| SHORT TERM ▸ |
| SPECIFICATION LIMIT 1 — 786 |
| ACTION ▸ |
| SPECIFICATION LIMIT 2 |
| SELECT ▸ |
| SPECIFICATION LIMIT 3 |
| SELECT ▸ |

SAVE   CANCEL

FIG. 28

≡ CAMBRIDGE-A-MAB     HOME   PROCESS LIMITS▾   BATCHES   ANALYTICS▾ ⊙ — 762

PROCESS DEFINITION — 764

> EXPANSION

∨ N-1 — 776      N-1    — 782    ✕

| PARAMETER NAME | UNIT OF MEASURE | PARAMETER CLASSES |
|---|---|---|
| FINAL VCC | x10⁶ cells/mL | KPA |
| VCC SPLIT | | KPP |
| DURATION | DAYS | KPP |
| VIABILITY | % | KPA |
| SGR | DAYS⁻¹ | CPP |

DEFINITION   ANALYTICS   ALERTS

ACTIVE ALERTS — 800   ☐ — 798

CHART TYPE — 802
   ○ INDIVIDUALS
   ○ I-MR

BATCH RANGE — 804
   LAST [30] BATCHES

ORGANIZE BY — 806
   ☐ SUB-PRODUCT
   ☐ MARKET — 807

> PROD

∨ INPUTS

| PARAMETER NAME | UNIT OF MEASURE | PARAMETER CLASSES |
|---|---|---|
| ANTIFOAM LOT | | CMA |
| OSMO | mOsm/Kg | WC-CPP |

∨ CULTURE

| PARAMETER NAME | UNIT OF MEASURE | PARAMETER CLASSES |
|---|---|---|
| GF TIME | HOURS | KPP |
| DURATION | DAYS | WC-CPP |

[SAVE]   CANCEL — 808

DYNAMIC BATCH LIMIT VALIDATION

CROSS REFERENCE TO RELATED APPLICATIONS

This application is a national stage application under 35 U.S.C. § 371 of International Application No. PCT/US2019/068002, filed 20 Dec. 2019 and entitled "Dynamic Batch Limit Validation", which claims priority to U.S. Provisional Application No. 62/782,920, filed on Dec. 20, 2018 and titled "Dynamic Batch Limit Validation", and U.S. Provisional Application No. 62/876,990, filed on Jul. 22, 2019 and titled "Dynamic Batch Limit Validation", all of which are hereby incorporated herein by reference in their entireties.

FIELD

The present disclosure relates generally to monitoring and analyzing compliance in data collection, and more specifically to dynamically applying limits to collected data.

BACKGROUND

Manufactured products, such as pharmaceutical products, food and beverage products, and other products generated through chemical and other processes, often must meet particular specifications, e.g., regulatory specifications, internal specifications, or the like. There may be specifications related to limits on certain components of the product (e.g., impurity percentages, chemical components, identity characteristics, etc.). Product specifications may depend on various factors, such as, for example, product type, target market, environmental impact, cost, and the like. For example, a pharmaceutical product has different limitations than a candy bar, and a product for children may have different requirements than a product for adults. During production or experimental runs, a company tests various chemical components and compositions for batches or runs of the product to assess whether the components fall within particular limits corresponding to a specification or parameter.

The applicable limits may be set by the company (e.g., to limit cost, ensure purity, desired performance, etc.), by a regulatory authority (e.g., to ensure safety and limit environmental impact), or by a third party interest (e.g., an investor). For example, a company may set limits for various parameters as goals during production of a product. As another example, regulatory authorities set limits for various parameter values to ensure that each batch of a product is of sufficient quality. A batch is in compliance with the established goals and/or regulations when its parameter values are within the prescribed limits. Limits may change over time, such as due to changing regulatory schemes, product changes, or the like, and, as such, batches analyzed at different times may have different applicable limits.

Regulatory bodies impose strict requirements on companies to manufacture products that meet certain standards and limitations (e.g., based on health, wellness, and safety of humans, animals, and the environment). In order to satisfy these requirements, companies must monitor their products and processes at all stages of development, and collect, organize, and analyze data related to the imposed requirements.

As one example, the Food and Drug Administration (FDA) Department of Health and Human Services requires that sampling and testing plans for products meet a set of standards to assure that drug batches meet appropriate specification and statistical quality control criteria as a condition for their approval and release. For example, drug manufacturing must use methods, facilities, and control procedures that are assessed as adequate to preserve drug identity, strength, quality, and purity.

In addition, regulatory bodies have imposed certain requirements on data management to ensure data integrity. Data integrity requires that data is complete, consistent, and accurate. In particular, with increasing use of computerized systems, many regulator schemes require that there be some controls in place on the data to prevent unauthorized access or changes. For example, the Current Good Manufacturing Practice (CGMP) for drugs released by the FDA requires a means to ensure data protection for any computerized system. For example, CGMP guidance recommends that there be a record of any data change made, the previous entry, who made the change, and when the change was made.

Conventional methods to monitor compliance in data collection require tedious, manual input and comparison of data or require programming skills. For example, companies often organize data in Excel spreadsheets, manually entering the data and applicable limits relevant at the time the data was collected. Such manual entry can be daunting as batches and their applicable limits can be numerous. Further, such manual entry often does not meet government mandates for data integrity since it fails to adequately track and preserve data.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein is generally related to a system for tracking compliance of collected data.

In one embodiment, a method for validating data with a data compliance tracking system is disclosed. The method includes receiving at least one data point from a computing element, wherein the data point corresponds to data collected from a sampling of at least one parameter during a batch run of a product and includes time stamp data; determining limit information corresponding to the at least one parameter, wherein the limit information includes at least one limit associated with at the least one parameter and has an associated valid value range; storing the at least one data point and the limit information; receiving an analytics request from a user device; analyzing the stored limit information to apply a limit to a select data point; and displaying an analytics output.

In another embodiment, a method of updating a dynamic limit value in a data compliance tracking system is disclosed. The method includes receiving a new limit value and a change reason associated with the new limit value from a first user device; transmitting an approval request to a second user device, wherein the user of the second user device has a satisfactory privilege level; receiving an approval of the new limit value from the second user device; determining a validity interval for the approved new limit value; generating a new limit value entry, the new limit value entry comprising the new limit value and the associated validity interval; storing the new limit value entry in memory; and updating the status of a prior limit value, stored in memory, to obsolete.

In yet another embodiment, a method of providing select data compliance feedback in real time to a user is disclosed. The method includes receiving a data value from a batch run of a product; determining the data value is approved; determining the approved data value is associated with an active alert, wherein the active alert is related to a limit or rule associated with the data value; evaluating compliance of the approved data value with the limit or rule; and transmitting an alert notification to a user indicating compliance of the approved data value with the limit or rule based on the evaluation.

This Summary is provided to introduce a selection of concepts in a simplified form that are further described below in the Specification. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 5A illustrates an example of a database structure for the system of FIG. 1.

FIG. 8 illustrates a user interface to adjust target control limit data.

FIG. 10 illustrates a user interface to adjust the limit status displayed for either specification limits or target control limits.

FIG. 11 illustrates a user interface displaying varying limits over time and for different markets.

FIG. 13 illustrates a user interface displaying information for a single batch used to generate data for one or more control charts.

FIG. 25 illustrates the user interface of FIG. 24 displaying the home screen with the alerts tab open to customize alerts.

FIG. 26 illustrates a user interface displaying an analytics tab that allows a user to customize one or more rules and/or limits for a selected parameter.

FIG. 27 illustrates the user interface of FIG. 26 displaying the analytics tab with rules and specification limits customized for the selected parameter.

FIG. 28 illustrates the user interface of FIG. 26 displaying an alerts tab that allows a user to customize one or more alerts for the selected parameter.

SPECIFICATION

Figure 1:
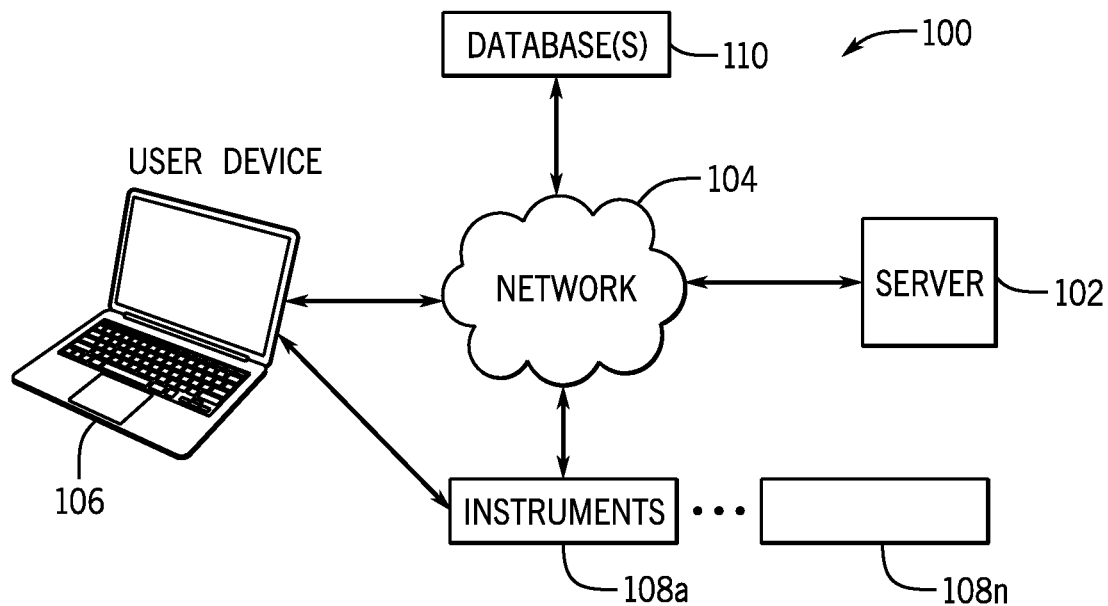
FIG. 1 is a block diagram illustrating an example of a data compliance monitoring system.

The system and methods of the present disclosure provide mechanisms to associate multiple limits with data collected for one or more parameters (e.g., chemical components, tracked values, or the like) for multiple batches or products or the like. As one example, during a product run or an experiment (e.g., drug development), several batches of a product may be produced through one or more chemical processes. The batches may have one or more limits associated with them, such as purity limits, desired ranges for a particular chemical characteristic (e.g., alcohol percentage, pH, temperature), and/or ranges for chemical components at various stages of the process. Data points or values for the batches may be collected, such as through instruments connected to the processing line (e.g., temperature probe, pH probes, flow meters, pressure sensors, spectrophotometers, and the like) and/or through automatic or manual sampling during the process. The values may be entered into a database either automatically and/or manually by a user.

The values or data points for the batches typically include one or more corresponding limits or thresholds (e.g., maximum, minimum) values that are acceptable (such as those falling within a particular regulatory requirement or needed for accuracy in following the product specification or recipe). The data compliance tracking system of the present disclosure associates values or data points with corresponding limits automatically, such that data points and values can be validated for the given limits irrespective of the time the validation is reviewed or run.

In several embodiments, the data compliance tracking system includes a batch or data point database and a limit database. The data point or value database receives and stores data points or values collected for various parameters or characteristics. The data point database may receive the information directly from a computing or other device (e.g., instrument) or from a user inputting the values into the system. The data points may include value metadata related to the surrounding circumstances of a particular sampling. For example, the metadata may include a time stamp indicating the date and/or time that the sample or batch was tested resulting in the collected data point(s). The limit database stores limit values for various parameters for applicable valid time intervals (e.g., effective windows of time). The validation window or validation interval includes a start time/date for a particular limit and, optionally, an end date or an on-going time/date for the particular limit. The system enforces non-overlapping valid date ranges for a given parameter (or for a parameter, sub-product, and market combination). As limit values may change over time, the limit database is able to collect and store various limit values and their applicable valid time intervals, without effecting the storage or data integrity of the data points in the values database.

Given the structures of the data point database and the limit database, analytics can be run within the system to determine compliance or otherwise analyze success for one or more batches corresponding to the desired outcomes, without separate identification of the applicable limits in effect at the time of the run. For example, when analyzing data, the system automatically applies the defined limit to batches manufactured during the corresponding limit validation window.

The system may supersede old or invalid limits with new limits as they are established, helping to prevent inadvertent destruction of batches based on outdated information. Such new limits may have different applicable effective windows of time. The system may apply the new limits to batches manufactured within the new window of time. The system can automatically apply limits based on when batches were manufactured and chart this relationship between batches and limits in graphical form.

In one embodiment, when retrieving data for analytics or other outputs to a user, the data compliance tracking system retrieves the desired data points for analysis, retrieves corresponding value metadata including time stamp information, and then analyzes the limit database to determine the applicable limit values for each data point stored in the data point database. The limit values are then applied to the respective data points or values, allowing the values to be graphically plotted or otherwise analyzed in a control chart (or other statistical tool) with the correct limits applied, such that data will be analyzed corresponding to the in-effect limit at the time the batch was processed, rather than the current limit in force for the particular parameter or characteristics. This allows accurate reflection of whether parameters or characteristics are and/or were valid at the time of manufacturing, rather than analyzing values under standards not in effect at the time. In this manner, a user can determine whether the collected data is or was within the prescribed limits and therefore in compliance with the regulations imposed at the time of data collection. This helps to alleviate issues with conventional systems that do not monitor and update limits, resulting in unnecessarily wasted product, wasted resources, and the like.

The system of the present disclosure allows both batch and limit filtering to display the appropriate batch and applicable limit to a user. There may be several batches of a product produced throughout the manufacturing process. Respective batches may have several limits associated therewith. For example, a batch may have numerous associated parameters (e.g., temperature, pH, toxicity, etc.), and each parameter may have numerous limits. For example, each parameter may have different limits based on the establishing authority (e.g., the company or one or more regulatory bodies), the sub-product (e.g., packaging or concentration), the limit date range or status, the market, and other miscellaneous factors (e.g., user-defined factors that may impact parameter values). The system is capable of quickly and efficiently filtering through batches and limits to apply the desired limit to the appropriate batch.

The system of the present disclosure provides a validatable means to comply with regulations on data integrity associated with product quality control. The system links data with context to expedite and satisfy government requirements related to data processing for quality control, while maintaining data integrity and demonstrable/tracked changes to various limits and data values. Further, the system provides a way for an average user with little to no computer programming expertise to organize and analyze data in a manner that is consistent, reliable, and valid, avoiding user error associated with manual input spreadsheets (e.g., Excel). The system requires little to no configuration by a user; rather, a user can create a process definition, enter specification and target control limits, enter batch data, and simply monitor compliance.

Further, the system allows users to receive automatic alerts as batches are run and limits are exceeded or based on other user set preferences, such as when new data values are entered. The alert functionality allows users to more closely monitor the process and helps to ensure that batches are run properly, allowing users to correct issues in the process as they arise, rather than after the fact.

Turning now to the figures, a system of the present disclosure will be discussed in more detail. FIG. 1 is a block diagram illustrating an example of a data compliance tracking system 100. The system 100 includes a user device 106, which may be in communication with one or more instruments 108a-n. The system may also include a server 102 and one or more databases 110, which may be in communication with the user device 106 and/or instruments 108a-n. Each of the various components of the compliance tracking system 100 may be in communication directly or indirectly with one another, such as through a network 104. In this manner, each of the components can transmit and receive data from other components in the system. In many instances, the server 102 may act as a go between for some of the components in the system 100.

The network 104 may be substantially any type or combination of types of communication system for transmitting data either through wired or wireless mechanism (e.g., WiFi, Ethernet, Bluetooth, cellular data, or the like). In some embodiments, certain components in the compliance tracking system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 104 and communication mechanisms for each of the components may be varied as desired.

The server 102 includes one or more computing devices that process and execute information. The server 102 may include its own processing elements, memory components, and the like, and/or may be in communication with one or more external components (e.g., separate memory storage) (an example of computing elements that may be included in the server 102 is disclosed below with respect to FIG. 2). The server 102 may also include one or more server computers that are interconnected together via the network 104 or separate communication protocol. The server 102 may host and execute a number of the processes executed by the system 100.

The user device 106 may be any of various types of computing devices, e.g., smart phones, tablet computers, desktop computers, laptop computers, set top boxes, gaming devices, wearable devices, or the like. The user device 106 provides output to and receives input from a user. For example, the user device 106 may receive limits and collected data from a user and output compliance information, alerts, and other notifications to a user. The type and number of user devices 106 may vary as desired.

The instruments 108a-n may be any type of instrument or technology used to create, sample, and test a product. For example, the instrument 108 may be any instrument used to perform an assay (e.g., a cell counter, mass spectrometer, NIR probe, or the like). As another example, the instrument 108 may be a sensor that can monitor one or more parameters (e.g., temperature, pressure, pH, electricity, motion, or the like).

The database or databases 110 may be any database that is linked to a user. For example, the database 110 may be an internal database used directly by a company or the database 110 may be an external database. For example, the company may access an external database that is associated with a regulatory authority. For example, the database may be associated with the U.S. Food and Drug Administration, the European Medicines Agency, Veterinary Medicines Directorate, the World Health Organization, the Health Products Regulatory Authority, or similar regulatory bodies. The databases 110 store compliance information, including specification limits for certain chemical components or chemical compositions, processes, or the like.

Figure 2:
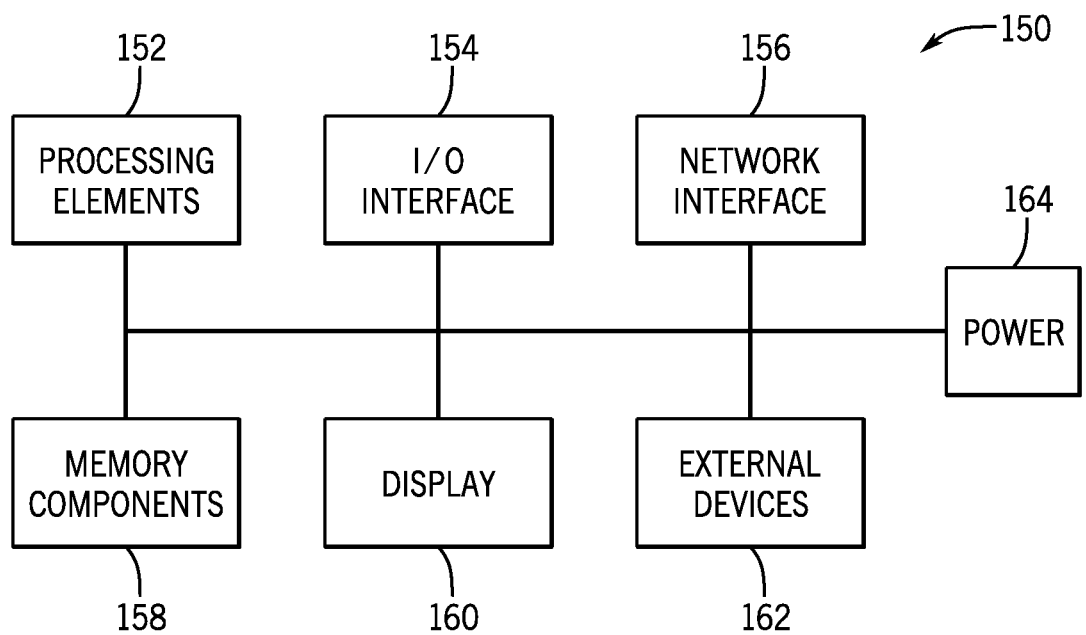
FIG. 2 is a simplified block diagram of a computing device representative of one or more components of the system of FIG. 1.

A simplified block structure for a computing device that may be used with the system 100 or integrated into one or more of the system 100 components is shown in FIG. 2. For example, the server 102, user device 106, instruments 108a-108n, and/or database(s) 110 may include one or more of the components shown in FIG. 2 and use one or more of these components to execute one or more of the operations disclosed in methods 200, 250, 500 and 550. With reference to FIG. 2, the computing device 150 may include one or more processing elements 152, an input/output interface 154, a network interface 156, one or more memory components 158, a display 160, one or more external devices 162, and a power source 164. Each of the various components may be in communication with one another through one or more busses, wireless means, or the like.

The processing element 152 is any type of electronic device capable of processing, receiving, and/or transmitting instructions. For example, the processing element 152 may be a central processing unit, microprocessor, processor, or microcontroller. Additionally, it should be noted that select components of the computer 150 may be controlled by a first processor and other components may be controlled by a second processor, where the first and second processors may or may not be in communication with each other.

The memory components 158 are used by the computer 150 to store instructions for the processing element 152, as well as store data, such as the collected data points (e.g., batch data), time information, limit values, and the like. The memory components 158 may be, for example, magneto-optical storage, read-only memory, random access memory, erasable programmable memory, flash memory, or a combination of one or more types of memory components.

The display 160 provides visual feedback to a user and, optionally, can act as an input element to enable a user to control, manipulate, and calibrate various components of the computing device 150. The display 160 may be a liquid crystal display, plasma display, organic light-emitting diode display, and/or cathode ray tube display. In embodiments where the display 160 is used as an input, the display 160 may include one or more touch or input sensors, such as capacitive touch sensors, resistive grid, or the like.

The I/O interface 154 allows a user to enter data into the computer 150, as well as provides an input/output for the computer 150 to communicate with other devices (e.g., server 102, instruments 108a-n, other computers, speakers, etc.). The I/O interface 154 can include one or more input buttons, touch pads, and so on.

The network interface 156 provides communication to and from the computer 150 to other devices. For example, the network interface 156 allows the server 102 to communicate with the instruments 108a-n through the network 104. The network interface 156 includes one or more communication protocols, such as, but not limited to WiFi, Ethernet, Bluetooth, and so on. The network interface 156 may also include one or more hardwired components, such as a Universal Serial Bus (USB) cable, or the like. The configuration of the network interface 156 depends on the types of communication desired and may be modified to communicate via WiFi, Bluetooth, and so on.

The external devices 162 are one or more devices that can be used to provide various inputs to the computing device 150, e.g., mouse, microphone, keyboard, trackpad, or the like. The external devices 162 may be local or remote and may vary as desired. The power source 164 may be any source of power that enables the computer 150 to function (e.g., wall power, a battery, or the like).

Figure 3:
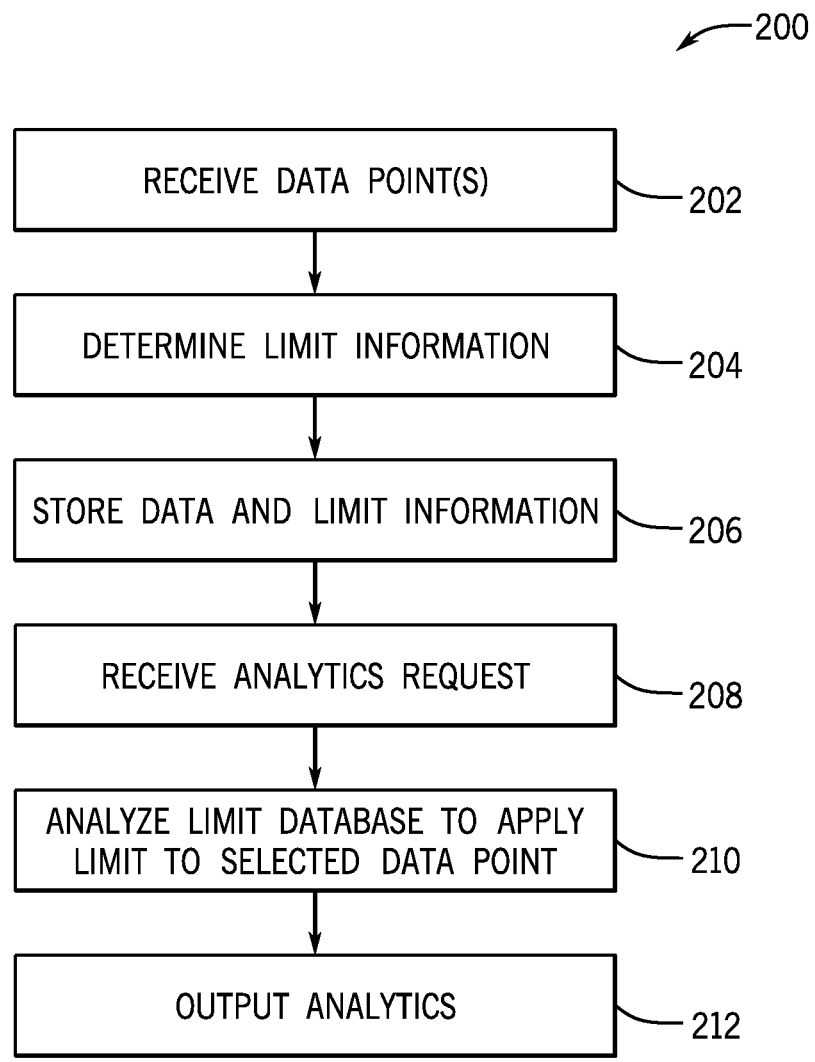
FIG. 3 is a flow chart illustrating a method for analyzing data based on corresponding limits within the data compliance monitoring system of FIG. 1.

FIG. 3 is a flow chart illustrating a method for analyzing data based on corresponding limits within the data compliance tracking system 100. The method 200 begins with operation 202 and the server 102 receives one or more data points or values. The data points may correspond to data collected from testing or sampling a batch of a particular product (e.g., a drug product). Generally, the sampling or testing of a batch is parameter-specific, i.e., sampling is based on one or more parameter values for a batch, such as, for example, temperature, pH, concentration of a particular substance or an impurity, viscosity, viability, hardness, dissolution, and the like. In another example, a tester may test for multiple parameters in one sampling. The collected data includes the parameter value or values and may include metadata associated with the circumstances of the sampling. For example, as shown in FIG. 13, the batch data 350 may also include a batch ID number or name 352 (e.g. identifying the batch to which the value applies), time stamp information 354 (e.g., time and/or date corresponding to the time and/or date that the batch was sampled or created), batch status 356, and any applicable sub-product 358 or market 360. The batch data 350 may include a reference URL 362 or attachment 364 to provide additional information/results related to the batch.

The batch data 350 may be manually input into the system 100 by a user or may be automatically uploaded to the system 100 as it is collected. For example, the values may be detected via one or more of the instruments 108*a-n* in the system 100. As an example, a thermometer can be used to detect and input temperature values for a particular batch sample. The one or more instruments 108*a-n* may be in communication with the server 102 and may send the collected batch data to the server 102 directly or over the network 104. The data values may be received directly from the instrument 108*a-n* or from a computing device or storage in communication with the instrument 108*a-n* or that has received information from the instrument 108*a-n* (e.g., via bulk data upload). The time stamp information may also be recorded directly by the instrument 108*a-n* when the values are recorded and may be uploaded to the server 102 directly or over the network 104. Alternatively, a computing device in communication with the instrument 108*a-n* may record the time when the data value was collected and upload the time stamp information to the server 102. In yet another example, the time stamp information may be automatically or manually entered into the system 100 when the batch data is uploaded (e.g., indicating the time the batch was entered into the system).

After operation 202, the method 200 proceeds to operation 204 and the server 102 determines limit information. Limit information may relate to valid standards set by a regulatory authority, thresholds set by a user, or the like. For example, a regulatory authority or user may set a maximum value, a minimum value, or a range for one or more parameters that corresponds to a safe or acceptable product for a particular market. Such a maximum, minimum, or range is a limit. If a parameter value exceeds the maximum value, falls below the minimum value, or falls outside the range set by the regulatory authority and/or user, the parameter value is not in compliance with the regulatory framework or with user-imposed limits. However, if a parameter value falls below the maximum value, above the minimum value, or within the range set by the regulatory authority and/or user, the parameter value is in compliance. Limit information may also be product-specific, as different quality attributes may apply depending on the product. In this manner, limit information may be based on various factors, such as for example, clinical experience with a particular product.

Figure 6:
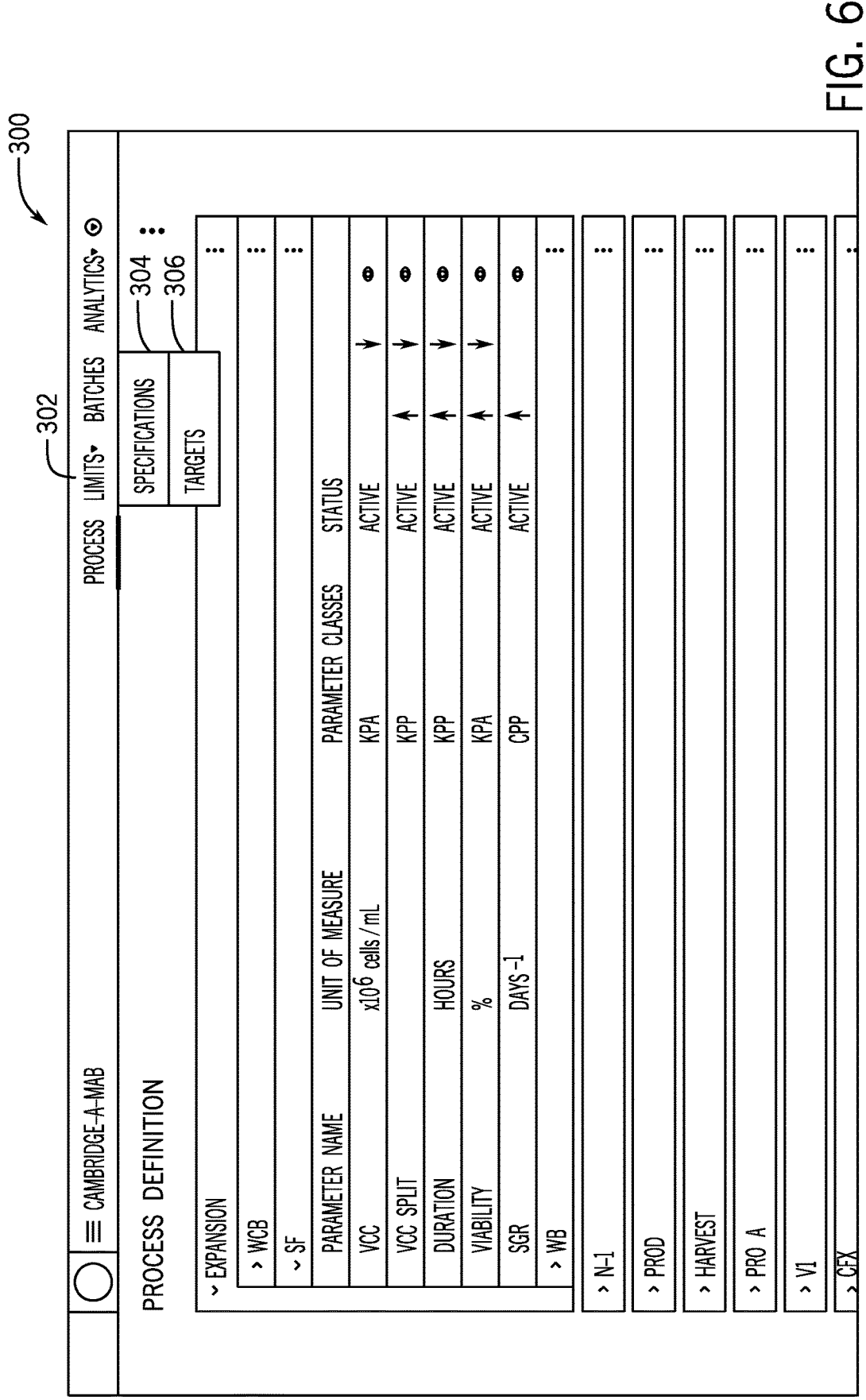
FIG. 6 illustrates a user interface allowing selection between different limit categories.

Limit information may be input by a user or may be acquired from one or more databases 110. As one example, limit information is input by a user through a user device 106. The user may interact with a user interface, such as the interface 300 shown in FIGS. 6-19, and 22. The user may select a limit category 302, such as for example, Specifications 304 or Targets 306, as shown in FIG. 6. Specifications 304 may be defined by a regulatory body while Targets 306 may be defined by a user or based on statistics, recipes, or goals. For example, Specification 304 limit values may depend on a regulatory authority's determination of what is safe or environmentally friendly (e.g., setting a bare minimum value). Specification 304 limits may be product-related (e.g., controlling an ingredient listing on the back of a drug product). As one example, Specification 304 limits can be varied based on a change of raw materials. As another example, Specification 304 limit values can be set for in-process parameters based on process development, validation studies, and/or FDA submissions.

Target 306 limit values, on the other hand, may be set by a user based on a user's target goals. Alternatively, Target 306 limit values may be based on statistics indicating a typical value (e.g., mean value) for a particular parameter. For example, Target 306 limit values may be control limits statistically derived from baseline batches or previous experience. Target 306 limits may be process-related (e.g., controlling operating ranges for the actual manufacturing process). Target 306 limits may extend over multiple batches. Often, Targets 306 may change more rapidly than Specification 304 limits.

Figure 7:
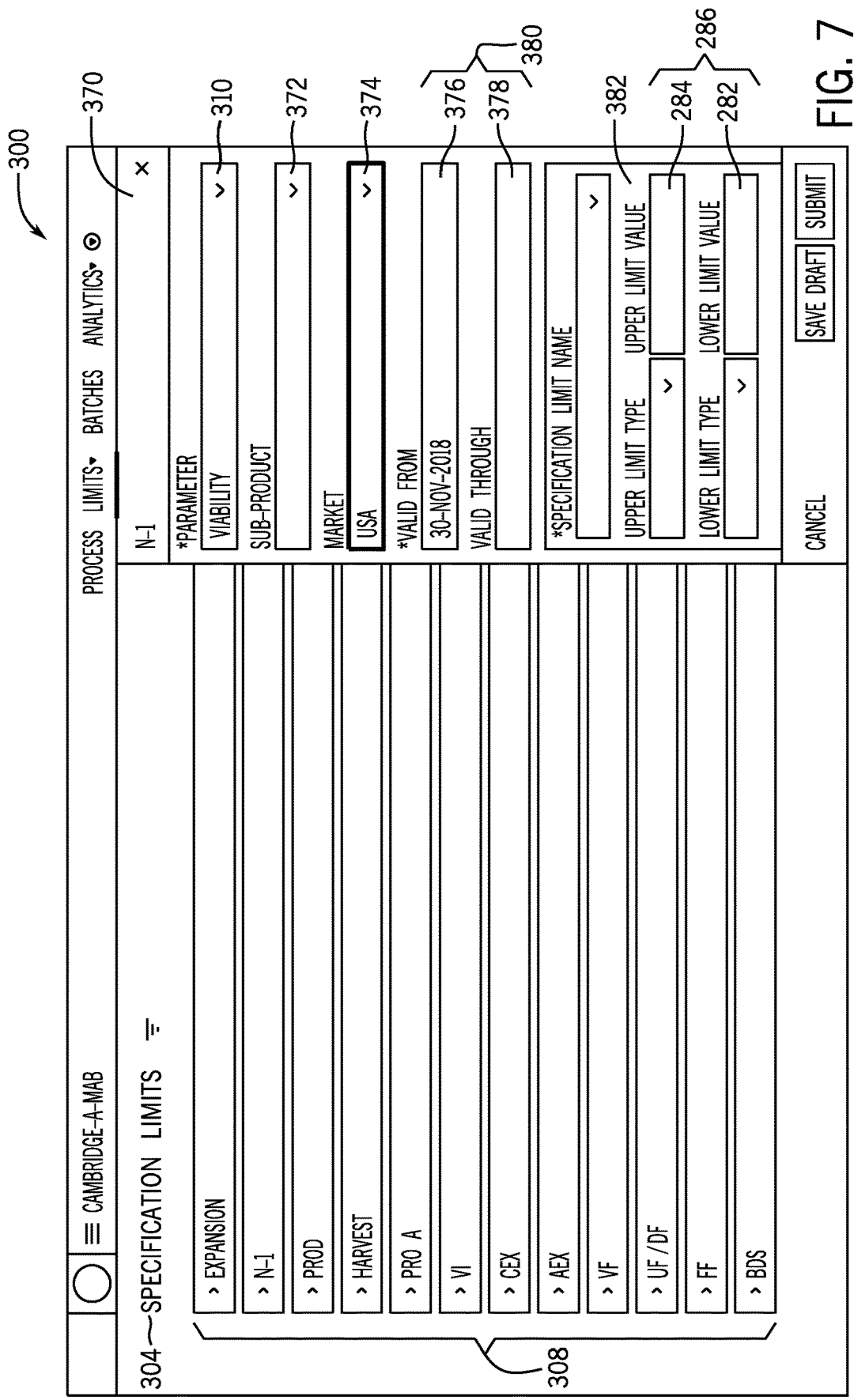
FIG. 7 illustrates a user interface to adjust specification limit data.

As shown in FIGS. 7 and 8, both Specifications 304 and Targets 306 may be defined by both an upper limit and a lower limit value, such that the limit is defined by a range. However, it is also contemplated that Specifications 304 and Targets 306 may be defined by either a minimum value or a maximum value. Specifications 304 and Targets 306 may include various unit operations or sub-categories 308 (e.g., as shown in FIG. 7, Expansion, N-1, Prod, Harvest, Pro A, VI, CEX, AEX, VF, UF/DF, FF, BOS, among others). As shown in FIGS. 8-11, each sub-category 308 contains particular parameters 310. For either Specifications 304 or Targets 306, a user may select a parameter 310 to adjust its associated limit. A user may input Specification 304 limits based on limit data gathered from a database 110 or the system 100 may be configured to automatically pull the limit data from the database 110. A user may also input Target 306 limits based on user preferences (e.g., goals) or statistical data acquired from a database 110. Alternatively, the system 100 may be configured to automatically pull statistical data from a database 110 to apply to Target 306 limit values.

After operation 204, the method 200 proceeds to operation 206. In operation 206, the system 100 stores the collected data and limit information. The information is stored in a discrete, organized fashion. For example, the system 100 may store the data in tables. As one example, the system stores the data and limit information in different storage databases or systems. FIG. 5A illustrates an example of a storage system 270 of the system 100. As shown, the storage system 270 includes a data point storage or value database 272 and a limit storage database 274. The data point storage database 272 stores data points collected for one or more parameters (e.g., batch data). In the embodiment shown in FIG. 5A, the data point storage system 272 includes multiple data points 275*a-g* collected for the parameter temperature. The data point 275*a-g* includes a parameter value 276 and a time stamp 278. In this example, the temperature value 276 was recorded in degrees Celsius and the time stamp 278 indicates both the date and time that the value was sampled. The time stamp information can be determined automatically based on the time the value was input into the storage, when the value was collected, when the batch from which the value corresponds was run, or the like.

The limit storage database 274 stores limit values for various valid time intervals 280 for one or more parameters 310. In the embodiment shown in FIG. 5A, the limit storage database 274 includes multiple limit entries 285*a-h* for the parameter temperature. In the example shown, each limit entry 285*a-h* includes a valid value range 286 with a minimum 282 and a maximum 284 temperature value in degrees Celsius, and an associated valid time interval 280. The limits (e.g., value ranges 286) may vary over the valid time intervals 280. As shown, there may not be overlapping valid time intervals 280, such that no time interval (e.g., a single date) has more than one limit entry 285*a-h* (or, in this example, more than one value range 286).

Figure 5B:
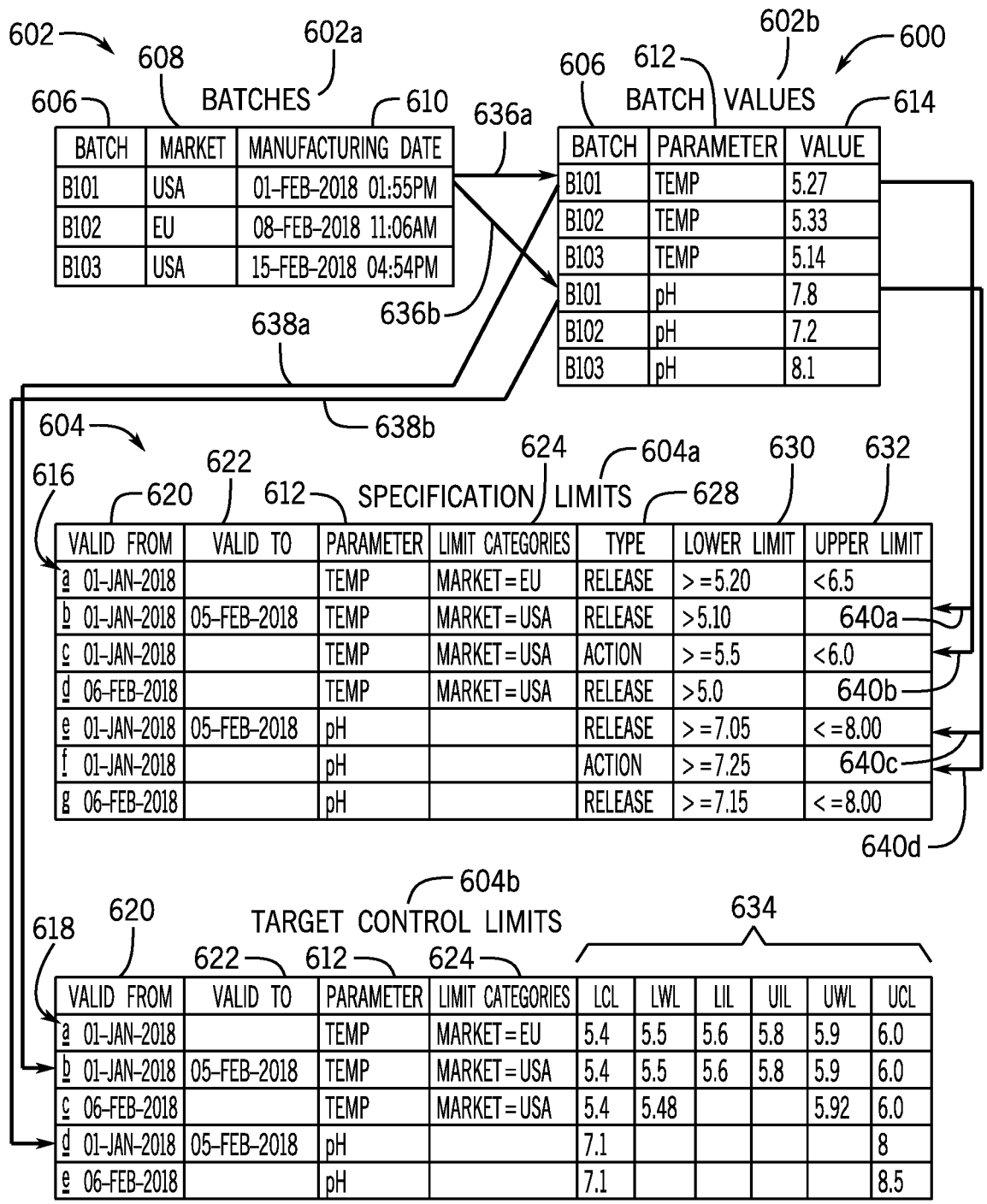
FIG. 5B illustrates another example of a database structure for the system of FIG. 1.

FIG. 5B illustrates another example of a storage system 600 of the system 100. As shown, the storage system 600 includes a batch database 602 and a limit database 604. The batch database 602 stores batch data associated with different batches 606. The batch database 602 may be a single database or it may be divided among several databases. As shown, the batch database 602 includes a batch identification database 602a and a batch value database 602b. The batch identification database 602a enables identification of batches 606 based on an identifier (e.g., a letter, number, or the like), the applicable market 608, and the manufacturing date 610. As shown, three batches 606 are stored in the batch database 602 with identifiers B101, B102, and B103. Each batch 606 has an associated market 608 and manufacturing date 610. As shown, batch 606 B101 was manufactured on 1 Feb. 2018 at 1:55PM and is associated with the U.S. market 608; batch 606 B102 was manufactured on 8 Feb. 2018 at 11:06AM and is associated with the European market 608; and batch 606 B103 was manufactured on 15 Feb. 2018 at 4:54PM and is associated with the U.S. market 608.

The batch value database 602b may be associated with the batch identification database 602a and may include one or more parameters 612 for each batch 606, as well as recorded values 614 for each parameter 612. As shown, the batch value database 602b includes the parameters 612 temperature and pH and includes their respective values 614. As shown, each batch 606 (e.g., B101, B102, B103) has both a temperature and a pH value recorded.

The limit database 604 stores limit data for one or more parameters based on various valid time intervals. The limit database 604 may be a single database or it may be divided among several databases. As shown, the limit database 604 includes a specification limit database 604a and a target control limit database 604b. The specification limit database 604a may include various specification limit entries 616a-g. As shown, the specification limit entries 616a-g include a valid from date 620, a valid to date 622, a parameter 612, a limit category 624, a type 628, a lower limit 630, and an upper limit 632. The specification limits may vary based on the limit categories 624. The limit categories 624 may include a particular market (e.g., as shown), a sub-product, or any miscellaneous category that may impact the limit (e.g., product type, equipment used, testing environment, and the like). In the example shown, the specification limits are applicable for the parameters 612 temperature and pH and for the U.S. and European markets. The type 628 may indicate the issuing authority. For example, the type 628 Release may be required by a regulatory authority, such as, for example the FDA. As another example, the type 628 Action may be issued internally, such as, for example, by the company. The specification limits may have a lower limit 630 value, an upper limit 630 value, or both (e.g., a limit range).

The target control limit database 604b may include various target control limit entries 618a-e. As shown, the target control limit entries 618a-e include a valid from date 620, a valid to date 622, a parameter 612, a limit category 624, and limit values 634. The target control limits may vary based on the limit categories 624 in the same manner as discussed above with respect to the specification limits. In the example shown, the target control limits are applicable for the parameters 612 temperature and pH and for the U.S. and European markets. The limit values 634 may include a lower limit value, an upper limit value, or both (e.g., a limit range). For example, as shown, the limit values 634 include values for Lower Control Limit (LCL), Lower Warning Limit (LWL), Lower Inner Limit (LIL), Upper Inner Limit (UIL), Upper Warning Limit (UWL), and Upper Control Limit (UCL).

After operation 206, the method 200 proceeds to operation 208 and the system 100 receives an analytics request, which may be a request for validation of collected data. For example, a user may want to know whether a particular batch is in compliance with regulations and/or goals at the time of sampling. To determine whether the batch is in compliance, the user submits an analytics request via the user device 106. The analytics can be substantially any type of relationship between the collected data points and the associated limits, such as a charting request. For example, the user may select a parameter 310 (e.g., temperature) and request that the system 100 chart the parameter data points relative to the associated limits on a graphical plot, known as a control chart 314, as shown in FIGS. 12, 14, 16, and 18. As another example, the user may request other outputs, such as, for example, overlay line plots, Box & Whisker plots, bar plots, and the like. For example, a user may desire such outputs to plot various specification limits.

After operation 208, the method 200 proceeds to operation 210 and the server 102 analyzes the stored data points and limits to apply an applicable limit to a selected data point. As one example, the server 102 may filter one or both of the stored data points (e.g., batch data) or limit data based on user selections, as discussed in more detail below with reference to FIGS. 20 and 21. As another example, with reference to FIG. 5A, the system 100 may use the storage system 270 to map limits to data points 275a-g based on time information. In this example, the system 100 automatically correlates respective data points 275a-g with their corresponding limit entry 285a-h, such as by associating the time stamp 278 with the valid time interval 280. For example, the system analyzes the time stamp to determine the applicable valid time interval, and then references the limit corresponding to the applicable valid time interval and applies that limit to the respective data point. In this manner, the limit database may function as a look up table for the data value database when retrieving analytics, ensuring that the data will have the correct limits applied as compared to relying on user entered limits at the time of the analytics.

In this manner, when the data point 275a-g is associated with a limit entry 285a-h, the system 100 can then determine whether the data point 275a-g was in compliance at its time of recordation (or apply other analytics). For example, the data point 275a has a time stamp 278 of 1:55PM on Feb. 6, 2018. This time stamp 278 corresponds to the valid time interval 280 Jan. 1, 2018-Mar. 3, 2018, as the date Feb. 6, 2018 falls within this range. This valid time interval 280 in turn corresponds to limit entry 285a. In this manner, the system 100 can determine that the data point 275a correlates to the limit entry 285a with a value range 286 between 4.5° C.-5.5° C. The temperature value 276 for data point 275a is 5.2° C., which falls within the value range 286 4.5° C.-5.5° C. for the limit entry 285a. Because the data point 275a falls within the limit entry 285a value range 286, the system 100 will determine that the data point 275a was in compliance when recorded or collected at 1:55PM on Feb. 6, 2018.

As another example, both data point 275c and data point 275d recorded the same temperature value 276 of 5.5° C. In this example, however, one of these data points 275c-d is in compliance, while the other is not, because compliance may depend upon the applicable limit in force when the data was recorded. In this example, data point 275c was recorded at 3:04PM on May 3, 2018, falling within the valid time interval 280 Mar. 4, 2018-Jun. 4,2018 that corresponds to limit entry 285b with a value range 286 of 4.4° C.-5.4° C. Data point 275d was recorded at 12:26PM on Aug. 22, 2018, which falls within the valid time interval 280 Jul. 16, 2018-Oct. 21, 2018 that corresponds to limit entry 285*d* with a value range 286 of 4.6° C.-5.6° C. The temperature value 276 of 5.5° C. falls within the limit for limit entry 285*d* with a value range 286 of 4.6° C.-5.6° C., but falls outside the limit for limit entry 285*b* with a value range 286 of 4.4° C. -5.4° C. Thus, the data point 275*d* is in compliance with its corresponding limit entry 285*d*, while the data point 275*c* is not in compliance with its corresponding limit entry 285*b*.

In another example, the data point 275*e* recorded a temperature value 276 of 4.8° C. at 4:54PM on Oct. 22, 2018. This data point 275*e* falls within the valid time interval 280 Oct. 22, 2018-Dec. 1, 2018 that corresponds to limit entry 285*e* with a value range 286 of 4.8° C.-5.7° C. In this example, both the time stamp 278 date and the parameter value 276 meet a terminal value of the valid time interval 280 or limit value range 286. For example, the date Oct. 22, 2018 for the data point 275*e* meets the first date Oct. 22, 2018 that starts the valid time interval 280 for limit entry 285*e*. This date is considered to be within the valid time interval 280 for the limit entry 285*e*, such that the limit entry 285*e* applies to the data point 275*e*. The temperature value 276 4.8° C. for the data point 275*e* matches the minimum value 282 of 4.8° C. of the limit for the limit entry 285*e*. The minimum value 282 is considered to be within the limit, such that the temperature value 276 for the data point 275*e* is within the limit. The system 100 will therefore determine that the data point 275*e* was in compliance at the time it was recorded.

While the valid time intervals 280 depicted in this example are in month long intervals, generally any timeframe may be used. For example, a valid time interval 280 may span hours, days, or years. Further, while the limit depicted in this example is a value range 286, it is also contemplated that the limit may be a single value, such as a minimum or maximum threshold.

As yet another example, with reference to FIG. 5B, the system 100 may use the storage system 600 to map limits to batches. The arrows shown in FIG. 5B represent an exemplary mapping of batches to limits. The system 100 may first identify an applicable batch 606 (e.g., based on user selection) based on its identifying information (e.g., as shown in the batch identification database 602*a*). For example, the system 100 may identify a batch 606 based on its identifier (e.g., B101, B102, B103), its market 608 (e.g., USA, EU), and/or its manufacturing date 610. In the example shown, the system 100 has identified batch 606 B101 that was manufactured on 1 Feb. 2018 at 1:55PM and is associated with the U.S. market 608.

Once the system 100 has identified the applicable batch 606, the system 100 may then associate the batch 606 with its applicable parameters 612 and values 614 (e.g., as shown in the batch value database 602*b*). For example, as shown, batch 606 B101 is mapped, as shown by arrow 636*a*, to a parameter 612 temperature with a value 614 of 5.27 based on the identifier B101. The batch 606 B101 is also mapped, as shown by arrow 636*b*, to a parameter 612 pH with a value 614 of 7.8 based on the same identifier B101. At this stage, the batch 606 is associated with an identifier, a market 608, a manufacturing date 610, a parameter 612, and a parameter value 614; however, it is contemplated that the batch 606 may be associated with other metadata as well based on the circumstances surrounding the batch 606.

The system 100 may map a batch 606 to one or more respective limits based on various factors associating the batch 606 with the limit. For example, mapping may be based on the batch manufacturing date 610, market 608, and/or parameter 612. For example, as shown, the batch 606 B101 is mapped to various target limit entries 618*b,d* in the target control limit database 604*b*, as shown by arrows 638*a,b*. As one example, the batch 606 B101 is mapped, as shown by arrow 638*a*, to target control limit entry 618*b*. Batch 606 B101 has been mapped to target control limit entry 618*b* because the batch 606 B101 manufacturing date 610 falls within the valid time interval defined by the valid from date 620 and the valid to date 622, and the market 608 and parameter 612 match the limit category 624 and parameter 612 for the target control limit entry 618*b*. The batch 606 B101 manufacturing date 610 1 Feb. 2018 falls within the valid time interval defined for the target control limit entry 618*b*, which has a valid from date 620 of 1 Jan. 2018 and a valid to date 622 of 5 Feb. 2018. The U.S. market 608 and temperature parameter 612 also match the limit category 624 (U.S. market) and parameter 612 (temperature) for the target control limit entry 618*b*. In this manner, the system 100 determines that the batch 606 B101 is associated with the limit values 634 LCL 5.4, LWL 5.5, LIL 5.6, UIL 5.8, UWL 5.9, and UCL 6.0. The temperature value 614 5.27 associated with batch 606 B101 falls within the LCL-UCL range of 5.4-6.0, outside the LWL-UWL range of 5.5-5.9, and outside the LIL-UIL range of 5.6-5.8. In this manner, the system 100 can determine that the batch 606 B101 is compliant with the control limit, but noncompliant with the warning and inner limits.

As shown, the batch 606 B101 is also mapped, as shown by arrow 638*b*, to target control limit entry 618*d*. In this example, the batch 606 B101 is mapped based on the manufacturing date 610 and the parameter 612. Batch 606 B101 has been mapped to target control limit entry 618*d* because the batch 606 B101 manufacturing date 610 falls within the valid time interval defined by the valid from date 620 and the valid to date 622 and the parameter 612 matches. As shown, the target control limit entry 618*d* is for the parameter 612 pH, which matches with the parameter 612 pH from the batch value database 602*b*. The batch 606 B101 manufacturing date 610 1 Feb. 2018 falls within the valid time interval defined for the target control limit entry 618*d*, which has a valid from date 620 of 1 Jan. 2018 and a valid to date 622 of 5 Feb. 2018. The target control limit entry 618*d* only has a control limit value associated with it. The control limit value 634 range for target control limit entry 618*d* is 7.1-8. The pH value 614 of 7.8 associated with batch 606 B101 falls within this range. In this manner, the system 100 can determine that batch 606 B101 is compliant with the applicable control limit.

As shown, batch 606 B101 is also mapped to various specification limit entries 616 b, c, e, and f in the specification limit database 604*a*, shown by arrows 640 a, b, c, and d. In this example, the system 100 matches (or filters) by manufacturing date 610, parameter 612, and market 608. The system 100 may filter by parameter 612 first, manufacturing date 610 second, and market 608 third, or the system 100 may filter in any other order. In one example, the system 100 filters by parameter 612 first. In this example, the system 100 may search the specification limit database 604*a* for any limits related to temperature, which is one parameter 612 associated with batch 606 B101. As shown, the specification limit entries 616*a-d* are all related to temperature.

Next, in this example, the system 100 may filter these specification limit entries 616*a-d* by manufacturing date 610. The system 100 may search these specification limit entries 616*a-d* for a valid from date 620 and valid to date 622 that include the manufacturing date 610 of 1 Feb. 2018 for batch 606 B101. In this example, the system 100 will determine that specification limit entries 616*a-c* all include the manufacturing date 610 of 1 Feb. 2018. Specification limit entry 616*a* has a valid from date 620 of 1 Jan. 2018 with no valid to date 622. No valid to date 622 means the limit is currently applicable (e.g., is valid to present). In this case, 1 Feb. 2018 fits within the date range 1 Jan. 2018 to present. This is also the case for specification limit entry 616*c*, which has the same date range. Specification limit entry 616*b* has a valid from date 620 of 1 Jan. 2018 and a valid to date 622 of 5 Feb. 2018, which also includes 1 Feb. 2018.

In this same example, the system 100 may subsequently filter the specification limit entries 616*a-c* by market 624. The system 100 searches for a market 624 that matches the market 608 for the batch 606 B101. The market 608 for batch 606 B101 is USA. As shown, the specification limit entries 616*b,c* are both associated with market 624 USA. As shown, arrow 640*a* maps batch 606 B101 to specification limit entry 616*b* and arrow 640*b* maps batch 606 B101 to specification limit entry 616*c*. In this manner, two specification limits are associated with the parameter temperature for batch 606 B101. The two specification limit entries 616*b,c* associated with batch 606 B101 are associated with two different types 628 of limits. Specification limit entry 616*b* is associated with the type 628 Release, while specification limit entry 616*c* is associated with the type 628 Action. Specification limit entry 616*b* has a lower limit 630 value of greater than 5.10 and no upper limit 632 value (e.g., showing the limit is a minimum). The temperature value 614 of 5.27 associated with batch 606 B101 is greater than 5.10 indicating that batch 606 B101 is compliant with the applicable Release limit for the parameter temperature. Specification limit entry 616*c* has a lower limit 630 value of greater than or equal to 5.5 and an upper limit 632 value of less than 6.0 (e.g., showing the limit is a range). The temperature value 614 of 5.27 associated with batch 606 B101 is less than the lower limit value 630 of greater than or equal to 5.5, such that the temperature value 614 falls outside the limit range. In this manner, batch 606 B101 is noncompliant with the applicable Action limit for the parameter temperature.

The same processing method can be executed for other parameters 612 associated with the batch 606. For example, the same filtering process may be executed for the parameter 612 pH associated with batch 606 B101. Following the same processing order, the system 100 may search the specification limit database 604*a* for any limits related to the parameter pH. As shown, the specification limit entries 616*e-g* are all related to pH.

Next, in this example, the system 100 may filter these specification limit entries 616*e-g* by manufacturing date 610. The system 100 may search these specification limit entries 616*e-g* for a valid from date 620 and valid to date 622 that include the manufacturing date 610 of 1 Feb. 2018 for batch 606 B101. In this example, the system 100 will determine that specification limit entries 616*e,f* encompass the manufacturing date 610 of 1 Feb. 2018. The date 1 Feb. 2018 falls within the date range 1 Jan. 2018 to 5 Feb. 2018 for specification limit entry 616*e* and within the date range 1 Jan. 2018 to present for the specification limit entry 616*f*. The date 1 Feb. 2018 does not fall within the date range 6 Feb. 2018 to present for specification limit entry 616*g*, so specification limit entry 616*g* is filtered out and no longer considered.

In this same example, the system 100 may subsequently filter the specification limit entries 616*e,f* by market 624. The system 100 searches for a market 624 that matches the market 608 USA for the batch 606 B101. As shown, the specification limit entries 616*e,f* are not associated with any market 624. In this case, the system 100 may determine that there is a match between batch 606 B101 and specification limit entries 616*e,f* based on the manufacturing date 610 and the parameter 612. As shown, arrow 640*c* maps batch 606 B101 to specification limit entry 616*e* and arrow 640*d* maps batch 606 B101 to specification limit entry 616*f*. In this manner, two specification limits are associated with the parameter pH for batch 606 B101. The two specification limit entries 616*e,f* associated with batch 606 B101 are associated with two different types 628 of limits. Specification limit entry 616*e* is associated with the type 628 Release, while specification limit entry 616*f* is associated with the type 628 Action. Specification limit entry 616*e* has a lower limit 630 value of greater than or equal to 7.05 and an upper limit 632 value of less than or equal to 8.00. The pH value 614 of 7.8 associated with batch 606 B101 falls within the limit range, indicating that batch 606 B101 is compliant with the applicable Release limit for the parameter pH. Specification limit entry 616*f* has a lower limit 630 value of greater than or equal to 7.25 with no upper limit 632. The pH value 614 of 7.8 associated with batch 606 B101 is greater than 7.25, indicating that batch 606 B101 is compliant with the applicable Action limit for the parameter pH.

In both examples depicted in FIGS. 5A and 5B, the system 100 may use the databases as lookup tables to coordinate data points or batch data with their respective limits. In another embodiment, the system 100 uses an algorithm with the databases to link limits to batches. For example, an algorithm may execute a process flow to populate correlated data within a chart.

After operation 210, the method 200 proceeds to operation 212 and the system 100 outputs analytics or other analysis related to the analytics request. For example, the system 100 may output a display graph illustrating the association between limits and data points and/or the compliance determination (i.e., whether the data point is within the associated limit). This information may be output in the form of a chart or table. For example, the information may be output in graphical form as shown in FIGS. 12, 14, 16-19.

Figure 12:
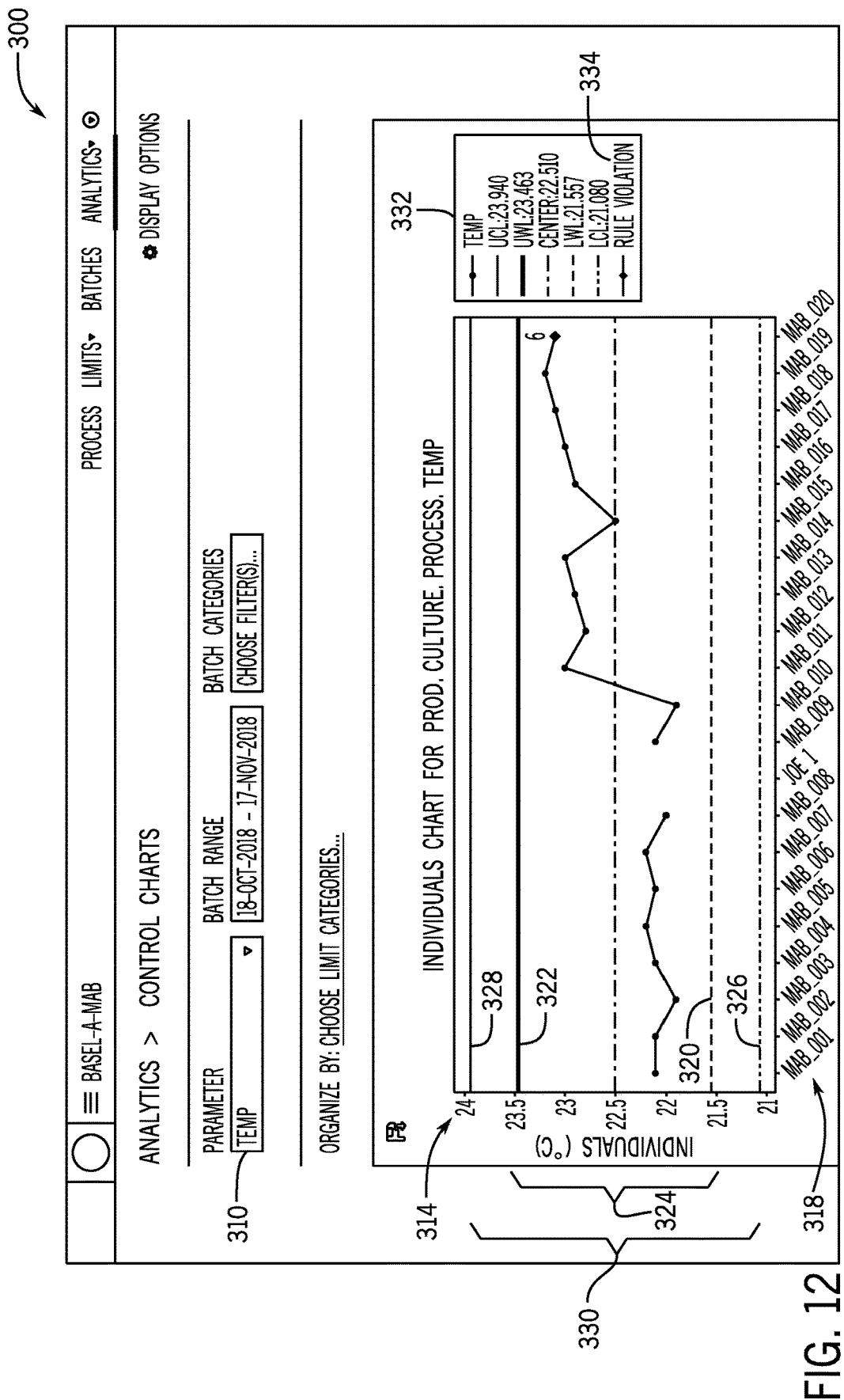
FIG. 12 illustrates a user interface displaying a control chart for a single parameter.

FIG. 12 shows an example of a control chart 314 for a single parameter 310. In this example, the parameter 310 temperature (° C.) is plotted with various data points collected from different batches 318 (e.g., labeled MAB_001-MAB_020). Two different types of limits associated with these data points have also been plotted on the graph as lines, shown both above and below the data points. While two types of limits are displayed in this example, it is contemplated that only one limit may be shown or more than two limits may be shown. The different limits displayed may correspond to one or more Target limits, one or more Specification limits, a unique issuing authority (e.g., the company or regulatory authority), a unique sub-product, a unique market, and the like. As shown in FIG. 12, a first limit is displayed with a valid value range 324 defined by the space between the minimum value line 320 and the maximum value line 322. In this example, the minimum value line 320 represents a Lower Warning Limit (LWL) and the maximum value line 322 represents an Upper Warning Limit (UWL). A second limit is shown with a valid value range 330 defined by the space between the minimum value line 326 and the maximum value line 328. In this example, the minimum value line 326 represents a Lower Control Limit (LCL) and the maximum value line 328 represents an Upper Control Limit (UCL) In this case, both displayed limits are the same for all the data points, and the limit lines 320, 322, 326, 328 extend across the entirety of the chart. While only the two limits, warning limit and control limit, are depicted, other limits are contemplated. As one example, another limit such as an inner limit, may be displayed, with a Lower Inner Limit (LIL) and an Upper Inner Limit (UIL). Such limits, LWL, UWL, LCL, UCL, LIL, and UIL may fix control chart limits, particularly when the data distribution is non-normal and the control limits are not symmetrical about the mean.

In the example shown in FIG. 12, the temperature data points fall within the minimum and maximum value lines 320, 322, or within the valid value range 324, and in between the minimum and maximum value lines 326, 328, or within the valid value range 330. Thus, the data points are within the respective limits, and the batch 318 is in compliance for the temperature parameter 310. As shown in the key 332 adjacent the chart 314, a rule violation 334 would result in a data point displayed in a different shape (e.g., a diamond in this example); however, other physical distinctions between a rule violation and other points are contemplated, such as, for example a different color (e.g., red vs. black). A rule violation 334 means a data point is not within the limit. In other words, the data point exceeds the maximum value (e.g., is above the maximum value line 322 or the maximum value line 328) or falls below the minimum value (e.g., is below the minimum value line 320 or the minimum value line 326). In this example, however, all the data points are within both limits such that no rule violation 334 is shown (and all data points have the same shape—circles in this case).

Figure 14:
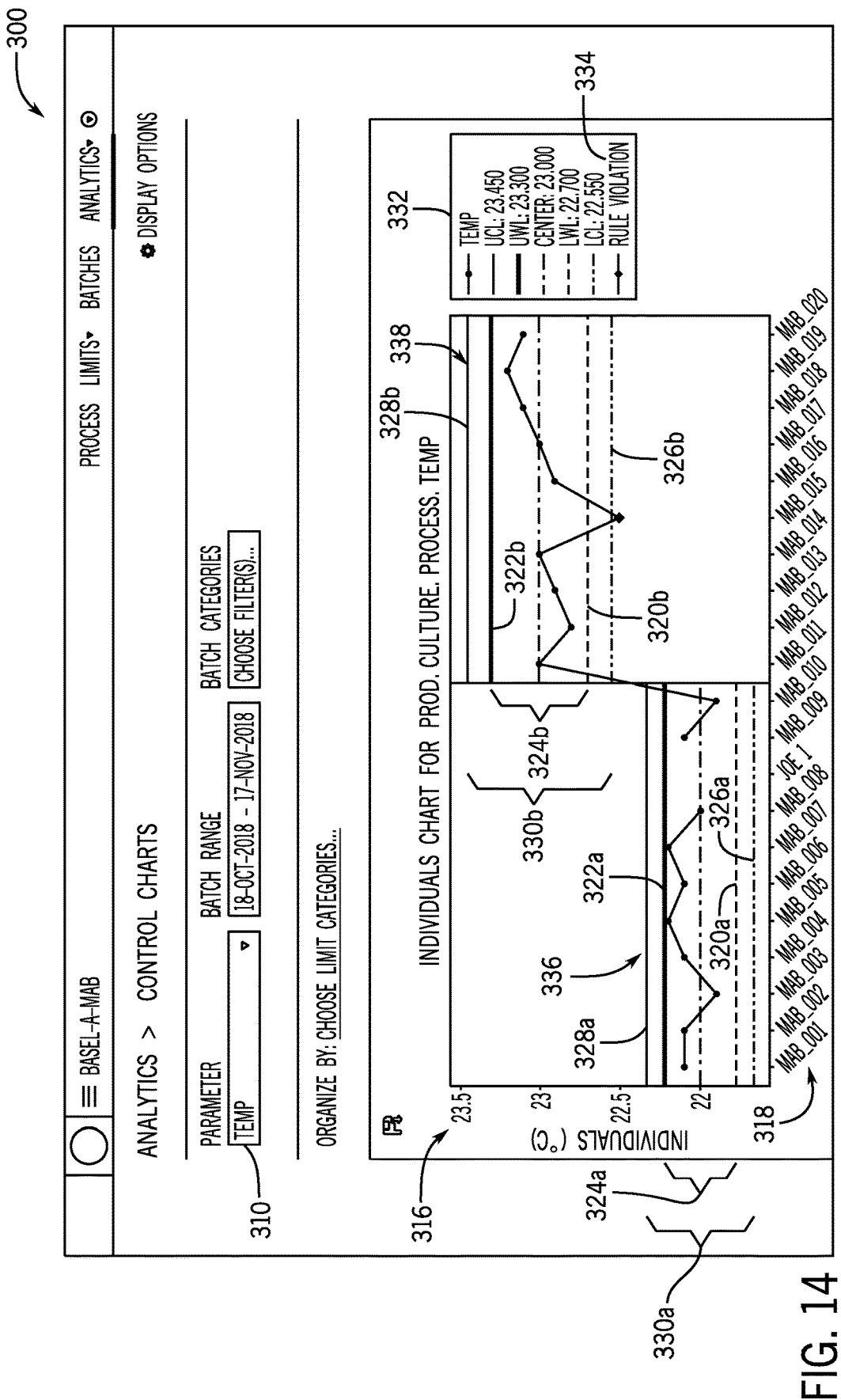
FIG. 14 illustrates a user interface displaying a segmented control chart for a single parameter showing a change in the limit over time.

FIG. 14 shows an example of a segmented control chart 316 for a single parameter 310. A segmented chart 316 or multiple limit chart may occur when the applicable limits for a parameter change over time. In FIG. 14, the control chart 316 includes the same data points from the batches 318 as shown in FIG. 12 and with the same two limit types in the graph. However, in this example, the values for both limit types changed when batches 318 MAB_011-MAB_020 were collected. In this example, the limit lines 320, 322, 326, 328 do not extend across the entire chart; instead, there are two sets of limit lines, or segments, 336, 338, reflecting a change over time in the limits (with valid value ranges 324a, 330a) from the first segment 336 to the limits (with valid value ranges 324b, 330b) in the second segment 338. In other words, one or more of the chart axis may change to be extended in order to capture the additional range prescribed by the varied limit.

For example, with continued reference to FIG. 12, batches 318 MAB_001-MAB_010 have a first set of limits as demonstrated by lines 336, with a limit having a valid value range 324a between a minimum value line 320a at about 21.7° C. and a maximum value line 322a at about 22.2° C., and another limit having a valid value range 330a between a minimum value line 326a at about 21.6° C. and a maximum value line 328a at about 22.3° C. Batches MAB_011-MAB_020 have a second set of limits demonstrated by lines 338, with a limit having a valid value range 324b between a minimum value line 320b at 22.7° C. and a maximum value line 322b at 23.3° C., and another limit having a valid value range 330b between a minimum value line 326b at 22.55° C. and a maximum value line 328b at 23.45° C. In this example, the data points for batches 318 MAB_001-MAB_010 are all within both valid value ranges 324a, 330a for the first set of limit lines 336, indicating that all of the batches 318 were in compliance with the regulations at the time the batches 318 were sampled. The data points for MAB_011-MAB_020, however, are not all within the second set of limit lines 338. The data point for batch 318 MAB_015 falls below both minimum value limits as shown by lines 320b and 326b, and is therefore not within either valid value range 324b or 330b. The data point is displayed in as a different shape (a diamond) (or a different color (e.g., red)) to indicate these rule violations 334. In this case, all of the batches 318, except batch 318 MAB_015, were in compliance with the regulations in place at the time the batches 318 were sampled. Batch 318 MAB_015, on the other hand, was not in compliance with the regulations in place at the time it was sampled, as indicated by the rule violation 334. While only two segments are shown in the depicted segmented chart, reflecting two different limit values over two different valid time intervals, more than two segments are contemplated reflecting various limit values over various valid time intervals.

Conventional tools are not able to chart values with different limits as shown in FIG. 14. Rather, two separate analytics plots would need to be run, one with the first batch of values with the first limit value and the second with the second batch of values with the second limit value. However, these two charts take a long time to generate, are inefficient, and do not provide the user with a holistic assessment of the performance of the parameter, as compared to a single multiple limit chart as shown in FIG. 14. This type of multiple limit analytics is possible due to the referential relationship between values and limits, allowing separate assessment of values as compared to limits and/or applying the limits on the backend of the plotting.

Figure 15:
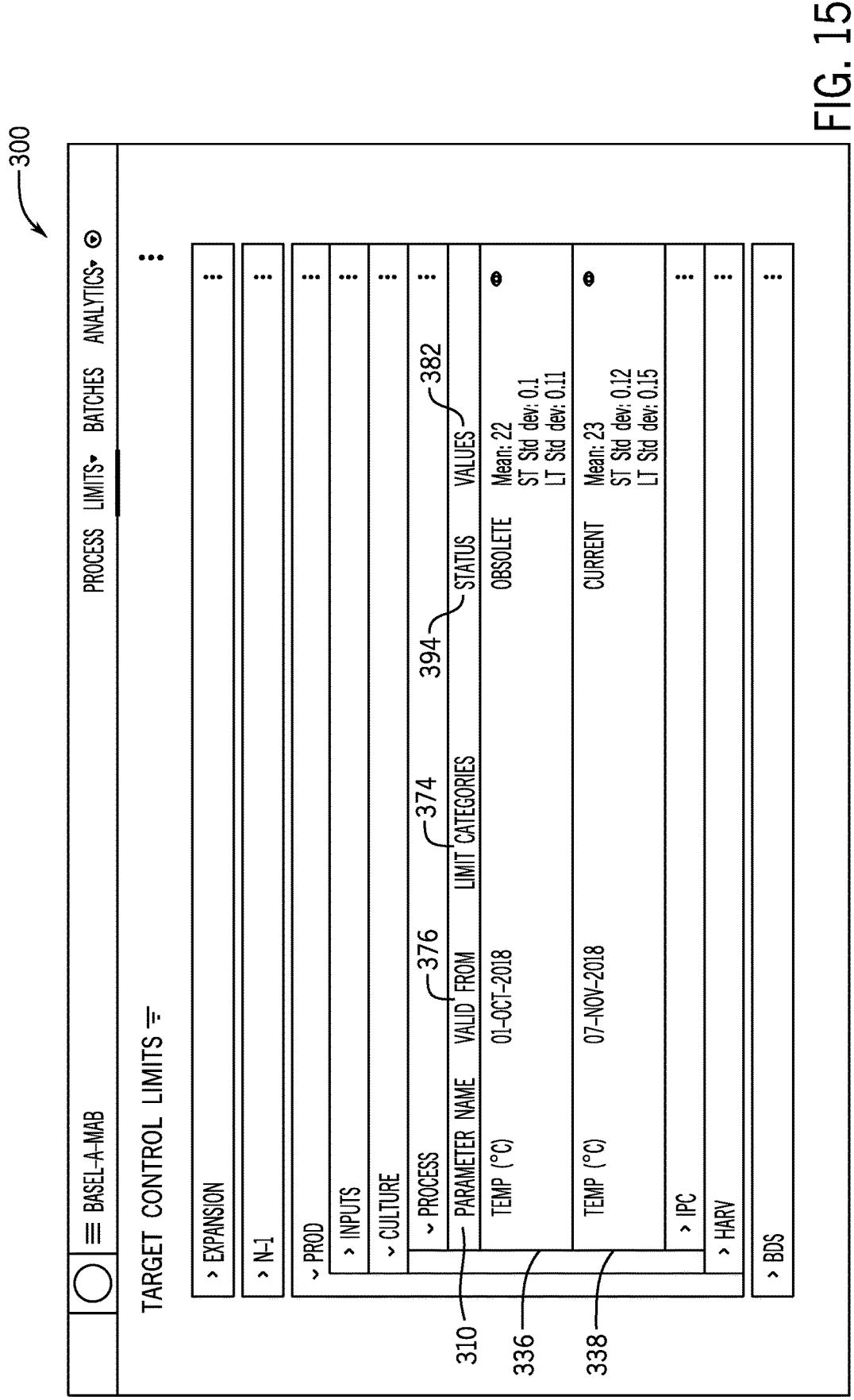
FIG. 15 illustrates a user interface displaying the change in limit data for the parameter displayed in the segmented control chart of FIG. 14 in table format.

FIG. 15 shows the varying limit data of each segment 336, 338 depicted in the segmented control chart 316 of FIG. 14 in table format. The first row shows the first segment 336 and the second row shows the second segment 338 displayed on the segmented control chart 316. The rows include relevant limit information for each segment 336, 338, such as the valid from date 376, limit categories 374, status 394, and values 382. As shown, the valid from date 376 for the first segment 336 is from 1 Oct. 2018. The first segment 336 limit is marked obsolete, meaning the limit is no longer applicable to current collected batch data. The next segment 338 limit is marked current and has a valid from date 376 of 7 Nov. 2018. The second segment 338 rendered the prior segment 336 obsolete, which means that the valid through date for the first segment 336 is the date prior to the valid from date 376 for the second segment 338. In other words, the first segment 336 has a valid through date of 6 Nov. 2018, the day prior to the valid from date 7 Nov. 2018 for the second segment 338. The valid time interval for the first segment 336 is 1 Oct. 2018 to 6 Nov. 2018, while the valid time interval for the second segment 338 is 7 Nov. 2018 to present. With reference to the segmented control chart 316 of FIG. 14, the batches 318 associated with the first segment 336 (e.g., MAB_001-MAB-010) were all collected at some time between 1 Oct. 2018 to 6 Nov. 2018, while the batches 318 associated with the second segment 338 (e.g., MAB_011-MAB_020) were all collected on or after 7 Nov. 2018, when the limit value for the temperature parameter changed.

Figure 16:
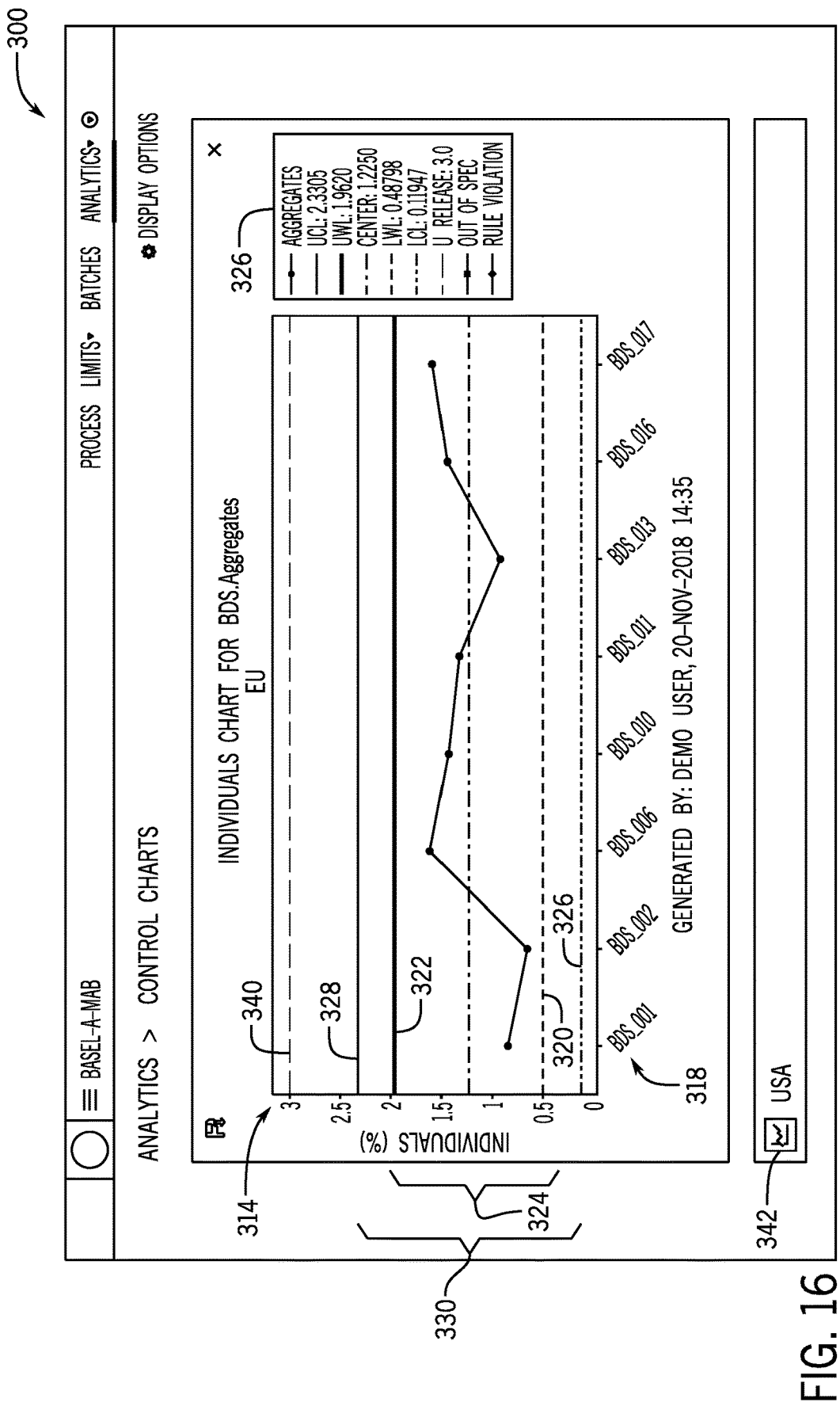
FIG. 16 illustrates a user interface displaying a control chart with a limit for a single market.

The format of the output may be adjusted based on user preference. For example, a user may prefer to view the output for a single market. Limits may vary depending upon the market. For example, the U.S. may have different regulations in place than in Europe. A batch may be in compliance with regulations in one market, but out of compliance with regulations in a different market. As shown in FIG. 16, data points are plotted in relation to limits imposed at the time in the European market. The same limits apply for each batch 318 labeled BDS_001-BDS_017 (as indicated by the single displayed segment), indicating that each batch 318 was sampled within the same valid time interval. In this case, three types of limits are displayed. Two types of limits shown have value ranges, while the third limit shown has an upper limit (or maximum) value. For a data point to be in compliance with the third limit, the data point must be below the upper limit value. One limit has a value range 324 with a minimum value line 320 and a maximum value line 322, another limit has a value range 330 with a minimum value line 326 and a maximum value line 328, and the third limit has a maximum value line 340. In this case, the data points are all within the value ranges 324, 330, and below the maximum value line 340, such that all the data points are in compliance with the European regulations at the time. As shown, a graph icon 342 labeled "USA" is located just below the European market chart. In this example, a user can select the USA icon 342 to view the same data points relative to the limit or limits imposed at the time in the U.S. market.

Figure 18:
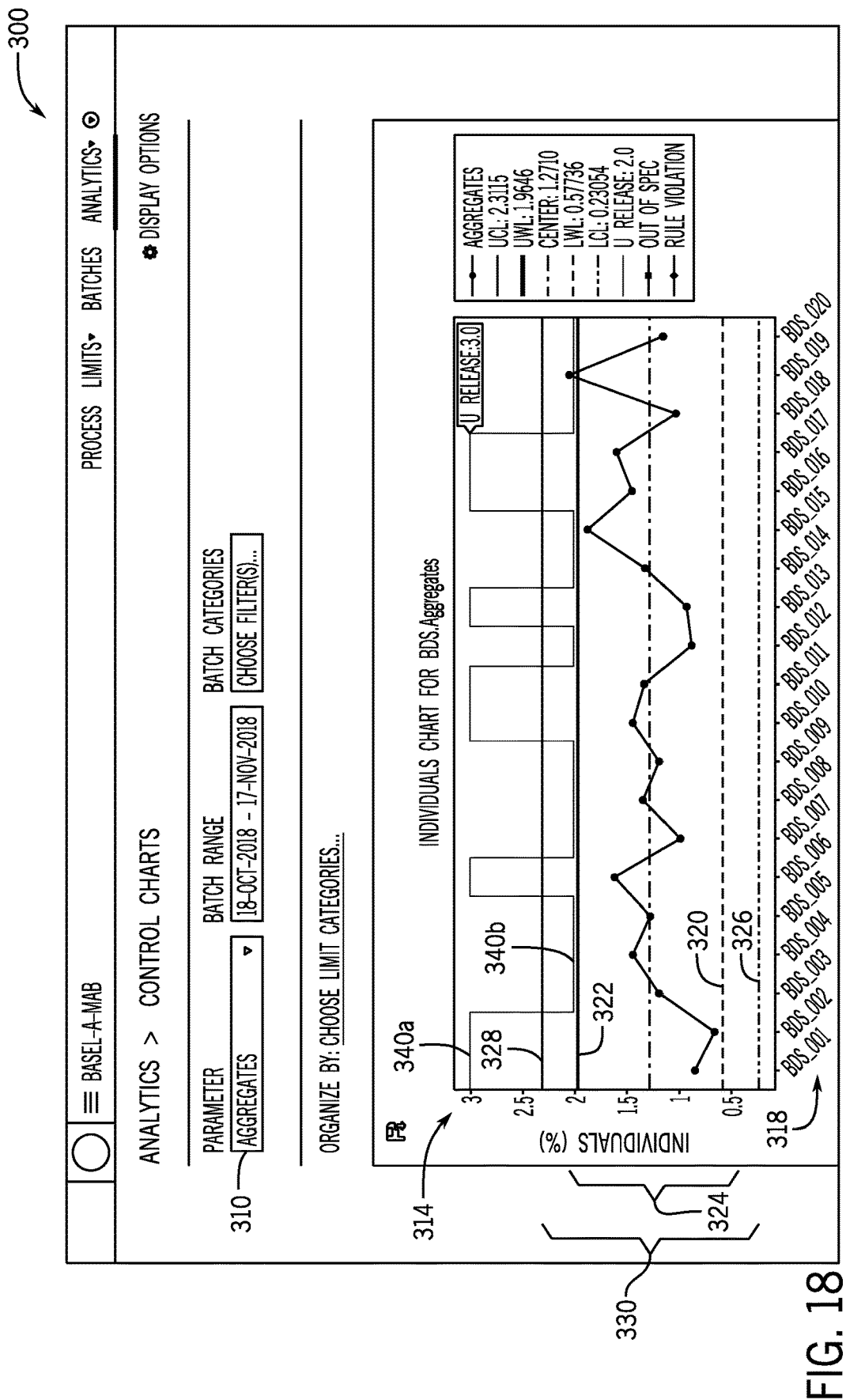
FIG. 18 illustrates a user interface displaying a control chart with limits for multiple markets.

Alternatively, several market limits and the performance of a particular characteristic or parameter for those markets can be displayed on the same chart. For example, as shown in FIG. 18, a control chart 314 can include limits for two or more markets 340a,b. In this example, both the EU and U.S. market limits 340a,b are shown. In this case, the depicted limit 340 is an upper limit value, and the U.S. imposed limit 340b is at about 2%, while the EU imposed limit 340a is at about 3%. In this manner, a user can ensure compliance with the applicable market that the user plans to enter with the tested product. In the depicted example, the data point must be below the upper limit value to be in compliance. All of the data points are below the EU upper limit line 340a, having a release limit value of 3.0. In other words, all of the data is compliant with the EU market for this limit. The data point associated with batch 318 BDS_018, however, is situated above the U.S. upper limit line 340b. In other words, batch 318 BDS_018 is not compliant with the U.S. market setting the upper release limit at 2.0. While batch 318 BDS_018 is compliant with the EU market, it is not compliant with the U.S. market.

Figure 17:
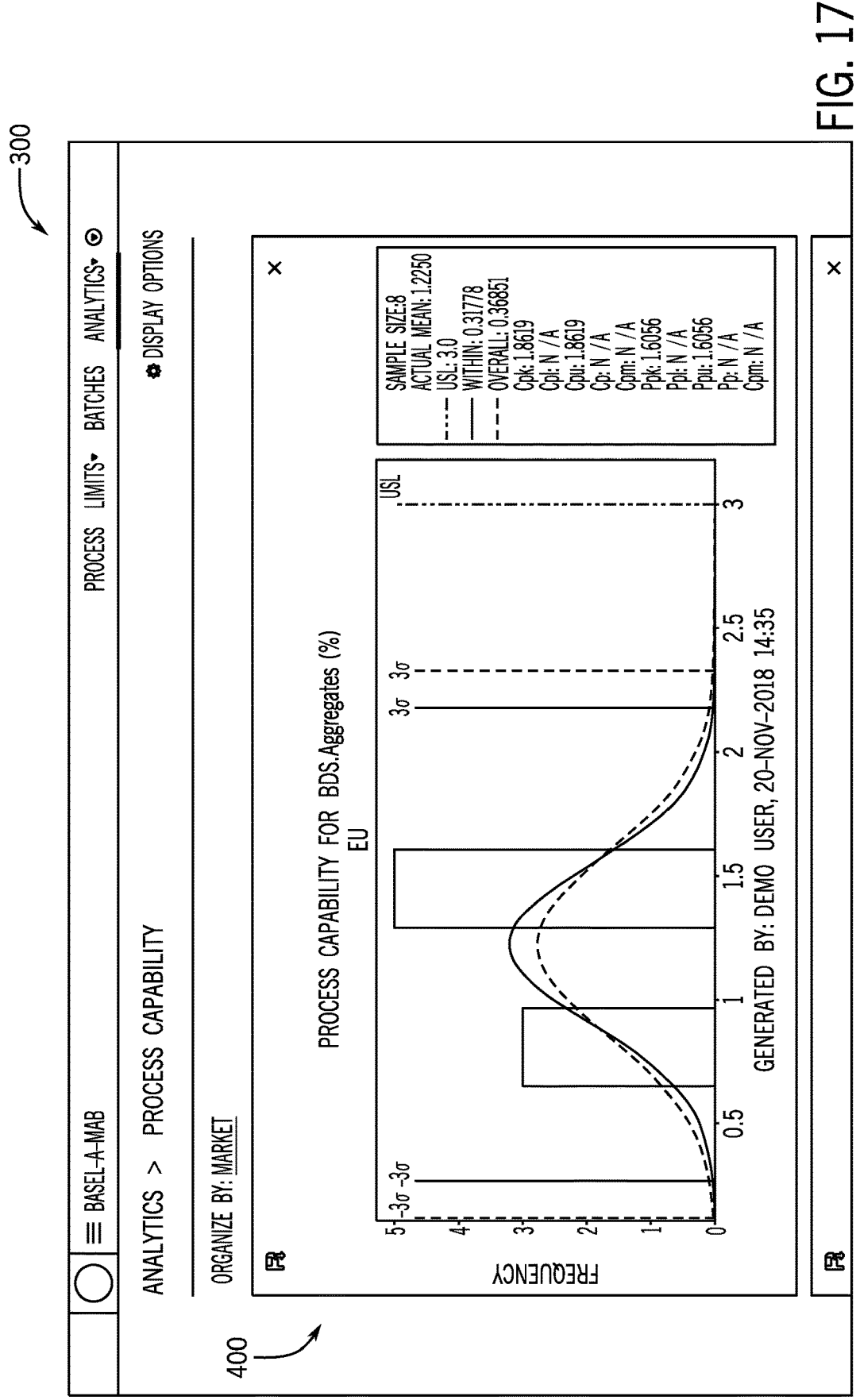
FIG. 17 illustrates a user interface displaying a process capability chart for a single market.

FIG. 17 shows another chart format that can be output by the system 100. In this example, the data is displayed in a process capability chart 400 for a single market (EU). Such a process capability chart 400 shows the variability of the process compared to the acceptable operating range. The process capability indices provide statistical measures that reflect the ability of a particular process to produce an output within the set specification limits.

Figure 19:
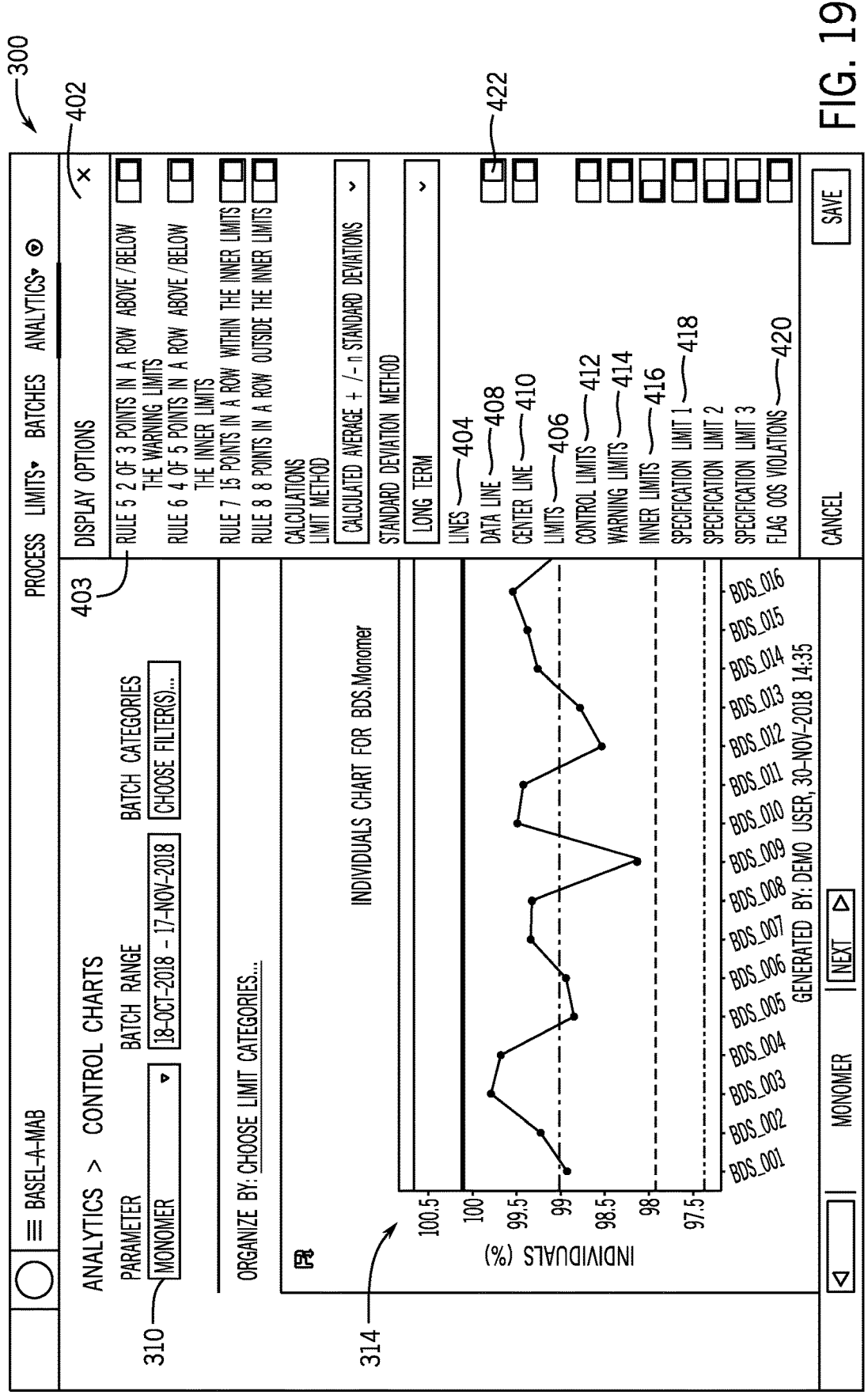
FIG. 19 illustrates a user interface display to adjust specification limits displayed on a control chart.

Additional user preferences may be incorporated into the charts 314, 316 by adjusting the display options 402, as shown in FIG. 19. For example, a user may selectively activate various rules 403 displayed on the chart 314 by turning them on or off. Rules 403 may be used to detect out-of-control conditions that indicate non-random variation. By detecting such non-random variation, a user can initiate an investigation for possible causes to reduce the risk of future batch failures. A user may adjust the number of points in the rule definitions to achieve the right balance between false signals and missing true non-random variation. In the depicted example, rules 5-8 are turned on.

As another example, a user may adjust the lines 404 and limits 406 displayed on the chart 314. As one example, the user may turn on or off the data lines 408 (e.g., connecting the data points) or the center line 410 (e.g., showing the mean value of the limit) on the chart 314. In the example depicted, all lines 404 are left on (as shown on the chart 314). As another example, the user may turn on or off different limits 406, such as, for example, control limits 412, warning limits 414, inner limits 416, and specification limits 418. In the depicted embodiment there are three different specification limits 418 and only one limit is turned on and depicted on the chart 314. As shown, a user may also turn on or off OOS (out of spec) violations. For example, a user may wish to view a visual cue when a limit is exceeded and may turn the OOS violation flag on. A toggle switch 422 is used to turn various display preferences on and off. For example, a toggle switch 422 in the right position means the display preference is on, while a toggle switch 422 in the left position means the display preference is off. It is contemplated that other buttons or indicators may be used to indicate this ON/OFF function.

The output control chart (e.g., as shown in FIGS. 12, 14, 16-19) may be interactive, allowing a user to select various points within the chart to determine underlying data. For example, a user may select on either the new limit or on a specific data point to view the associated change reason and any reference URLs or attachments that may indicate to the user why the limit changed or who made the changes. In this manner, a user can view real time history for any limit associated with each data point. A user may also select individual data points on the chart to view underlying batch metadata for the selected data point (for example, the information shown in FIG. 13).

Figure 22:
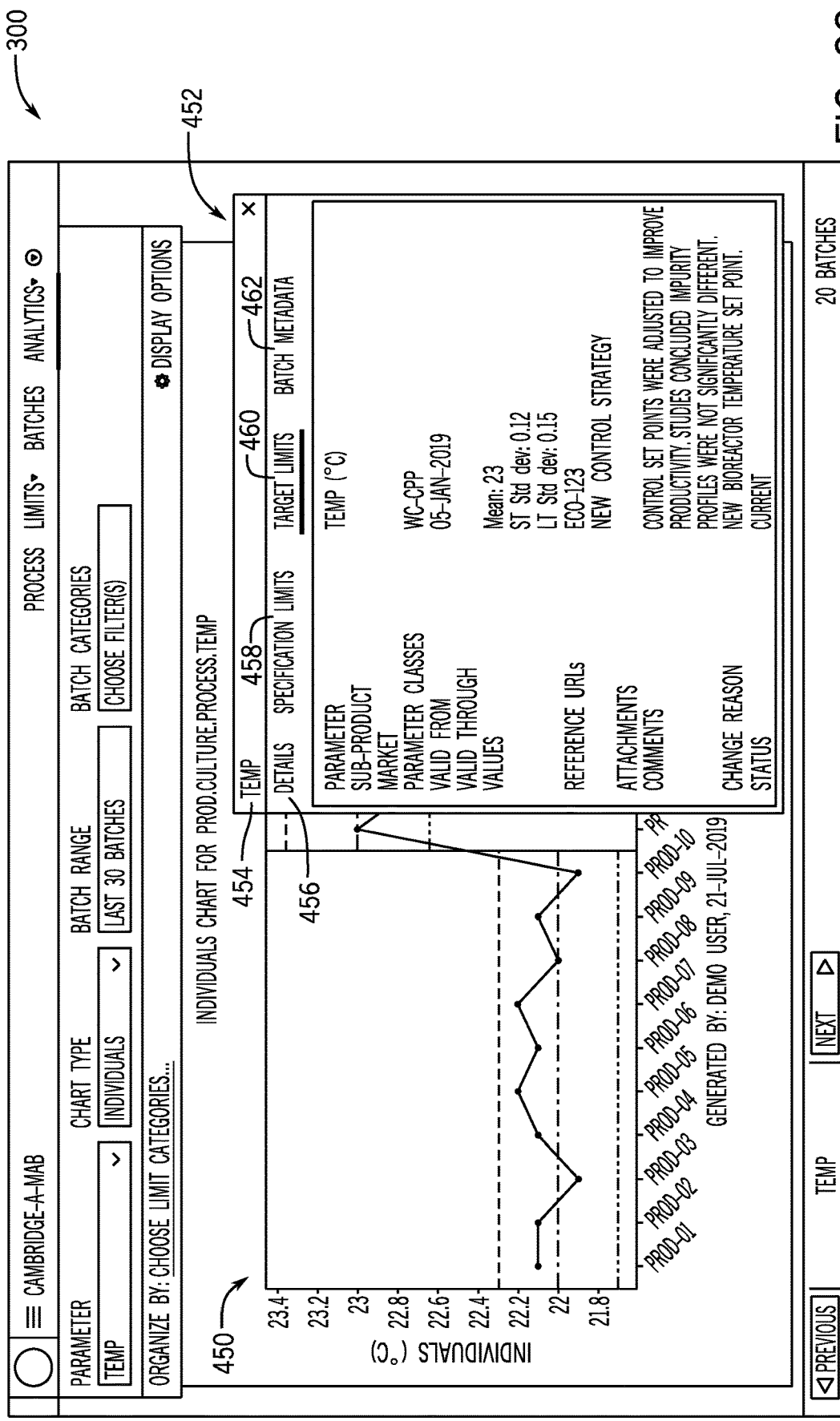
FIG. 22 illustrates a user interface displaying an interactive control chart with a graphic for displaying metadata associated with a data point.

FIG. 22 shows an example of an interactive output control chart. As shown, the control chart 450 has a plurality of interactive data points. A user can hover a cursor over and/or select a data point to view metadata associated with the data point. For example, when a user hovers over or selects a data point, a text box or other graphic 452 is displayed providing information related to the data point. The graphic 452 may indicate the parameter associated with the data point and may include tabs separating the data into categories. As shown, the graphic 452 indicates the parameter 454 Temperature is associated with the data point. The graphic also includes four tabs with categories "Details" 456, "Specification Limits" 458, "Target Limits" 460, and "Batch Metadata" 462. The Details category 456 may include information related to the data point, such as values and trends for the data point. For example, the information may indicate whether the data point is an outlier (e.g., does not fit the trend of the other data points or is non-compliant, i.e., exceeding or outside the applicable limit).

The Details category 456 may also include a space for entering in additional information. For example, a user may update information about the batch associated with the data point. The user's information and time of entry is recorded and associated with the data entry. The Specification Limits 458 and Target Limits 460 may include information on the limits associated with the data point (e.g., issuing authority, market, etc.). The Batch Metadata 462 may include information related to the circumstances surrounding the batch associated with the data point. For example, the Batch Metadata 462 may include a batch identifier, a market, a manufacturing date, a parameter, and a parameter value associated with the data point. It is contemplated that one or more of the information shown in FIG. 13 may be included in the Batch Metadata 462. By providing easy access to information related to the data points, such a graphic 452 enables users to quickly review batch and conformity data, without having to separately run reports or analytics outside of the chart. Additionally, by providing the ability to enter and review changes related to each data point, the graphic 452 provides additional data integrity.

As shown in FIG. 22, the Target Limits category 460 is selected within the graphic 452 and includes information related to the target limit associated with the data point, including parameter value, sub-product, market, parameter classes, validity interval (e.g., valid from and valid through dates), values, reference URLs, attachments, comments, change reason, and status. As shown, the parameter associated with the target limit is Temperature, which matches the parameter 454 associated with the data point. The parameter class is WC-CPP. The limit is valid from 5 Jan. 2019 through present. The limit has a mean value of 23, a ST Std dev of 0.12, and an LT Std dev of 0.15. A user has filled out the comments and change reason sections. For example, a user may enter comments when there are updates to a limit. The information may also include identifying user information and the time the user updated the limit. The status of the limit is indicated as current. The same or similar information may be included with the Specifications Limits tab. It is also contemplated that a user may upload reference URLs, attachments, and comments in any tab to provide additional information for that category. While the interactive graphic 452 is depicted with a segmented control chart, it is contemplated that the interactive data points and graphic 452 can be used with any graphical output, such as, for example, with the control charts 314 depicted in FIGS. 12, 16, 18, and 19.

In another embodiment, the analytics may be output in the form of a table. For example, each data point may be displayed in a table with its corresponding limit. In one embodiment, the table may show compliance status for each data point. For example, the table may indicate whether each data point was in compliance with the regulations or goals in place at the time the data point was collected. In other words, the table may indicate whether each data point was within its associated limit. This information may be conveyed to a user by a YES (indicating compliant)/NO (indicating noncompliant), by color coding (e.g., green for compliant and red for noncompliant), or any other means to distinguish compliant from noncompliant.

Figure 4:
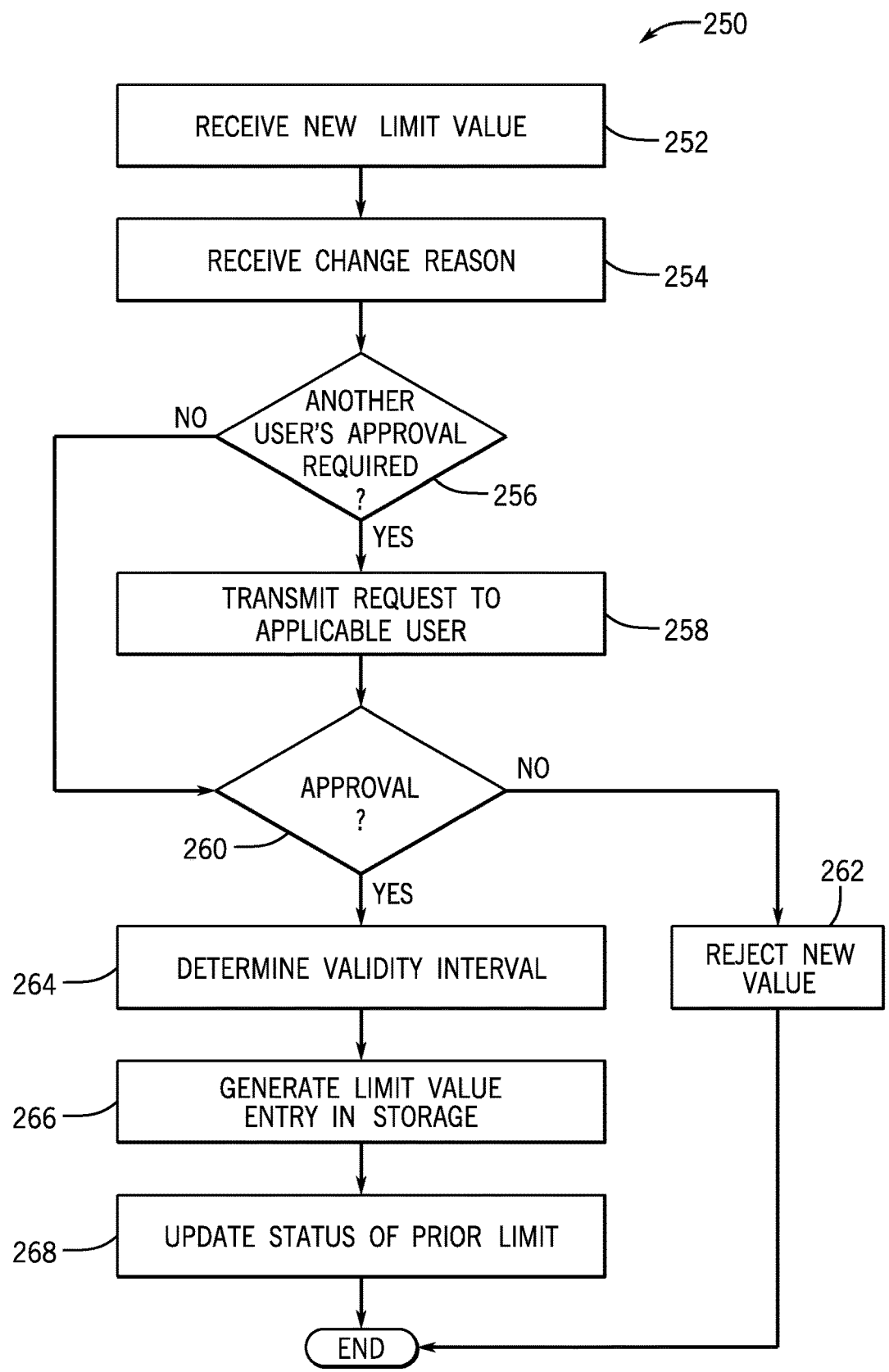
FIG. 4 is a flow chart illustrating a method for updating limit values within the data compliance monitoring system of FIG. 1.

In some embodiments, the system may also restrict and/or track limit variations to ensure integrity within the system. FIG. 4 is a flow chart illustrating a method for updating limit values within the data compliance tracking system 100. The method 250 begins with operation 252 and the server 102 receives a new limit value, such as through referencing a database, receiving from a user device, or other type of input. A limit value for a particular parameter or set of parameters may be input into the system 100 as it changes over time. For example, a regulatory authority may change standards based on new findings (for example, on findings concerning what parameter values are considered safe, environmentally friendly, and the like) or a user may change limits based on new goals (for example, a company may change its goals if the company faces new expenses, acquires new investors, changes its business plan, or the like). As the limit changes, new limit values may be input into the system 100.

In one example, limit values are automatically updated based on updates to an associated database 110. For example, the database 110 may be associated with a regulatory authority and limit information may be pulled directly from the database on a set time interval (e.g., weekly, quarterly) or as updates occur (e.g., push retrievals or on-demand). Limit information may automatically populate within the system 100 as limit information is updated in the database 110 (e.g., dynamically as the limit information changes). Alternatively, the system 100 may periodically check the database 110 for limit updates at particular time intervals. For example, the system 100 may check for updates hourly, daily, weekly, monthly, annually, or within any other time interval. The system 100 may pull updated limit information from the database 110 when a change is detected and store the limit information in the limit storage database 274.

Alternatively, a user may update limit values within the system 100. For example, a user may adjust limit values to meet new goals set by the company, process changes, protocol changes, manufacturing changes, composition or component changes, or the like. As another example, a user may monitor limit values set by a regulatory authority and add new or updated limit values to the system 100.

With reference to FIG. 11, a user can view information related to various limits for different parameters and the limit information displayed may include a limit category (e.g., the applicable market) 374, the valid from date 376, the status 394, and the limit value 382. In the example shown, there are three limit entries 396*a-c* for the parameter 310 Aggregates (%). The status 394 indicates whether the limit is the most current limit or is obsolete. With reference to FIG. 10, a user may control the status 394 displayed for each parameter. For example, a user may selectively view limits that are Obsolete, Current, Future, Draft, Pending, or Rejected, or other statuses as desired.

A limit may be obsolete when its "valid through" date is in the past. In other words, the limit is no longer applicable to current data collected; rather, the limit only applies to past data previously collected. A current limit, on the other hand, may have an open "valid through" date or a "valid through" date that is set in the future and is currently applicable to any data collected in real time. A future limit has a "valid from" date that starts at some point in the future, indicating that the limit only applies to data collected from that future date forward in time. A draft limit is a new limit value entered by a user that has been saved by the user but not submitted. In other words, the new limit value is incomplete and not yet a valid active limit. A pending limit is a new limit value entered by a user that has been submitted for approval to a user with a satisfactory privilege level. The limit is not valid until approved by the higher level user. A rejected limit is a new limit value entered by a user that has been sent to a higher level user for approval but for some reason rejected by the higher level user as an invalid or inappropriate change. A rejected limit is not a valid limit value.

With continued reference to FIG. 11, both Obsolete and Current limits were selected for the European and U.S. markets. If a user were interested only in compliance with the European market, a user would look to the first data entry 396*a* that provides limit information related to the European market. The limit information for Aggregates (%) for the European market indicates that the most current valid limit with a release value of less than or equal to 3.0 is valid from 1 Oct. 2018. In other words, a user can only use the limit value 382 of less than or equal to 3.0 to determine compliance for a batch that was sampled on or after Oct. 1, 2018. A user cannot use the limit value 382 of less than or equal to 3.0 to determine compliance for a batch that was sampled before Oct. 1, 2018. If a user were interested only in compliance with the U.S. market, a user would look to the second and third limit entries 396*b,c* that provide limit information related to the U.S. market. As shown, the limit in the second limit entry 396*b* is obsolete, while the limit in the third limit entry 396*c* is current. If a batch was sampled from 1 Oct. 2018 to 29 Nov. 2018, then the limit value in the second limit entry 396*b*, less than or equal to 2.0, would apply to the batch. If a batch was sampled any time on or after 30 Nov. 2018, then the limit value in the third limit entry 396c, less than or equal to 2.5, would apply to the batch.

Figure 9:
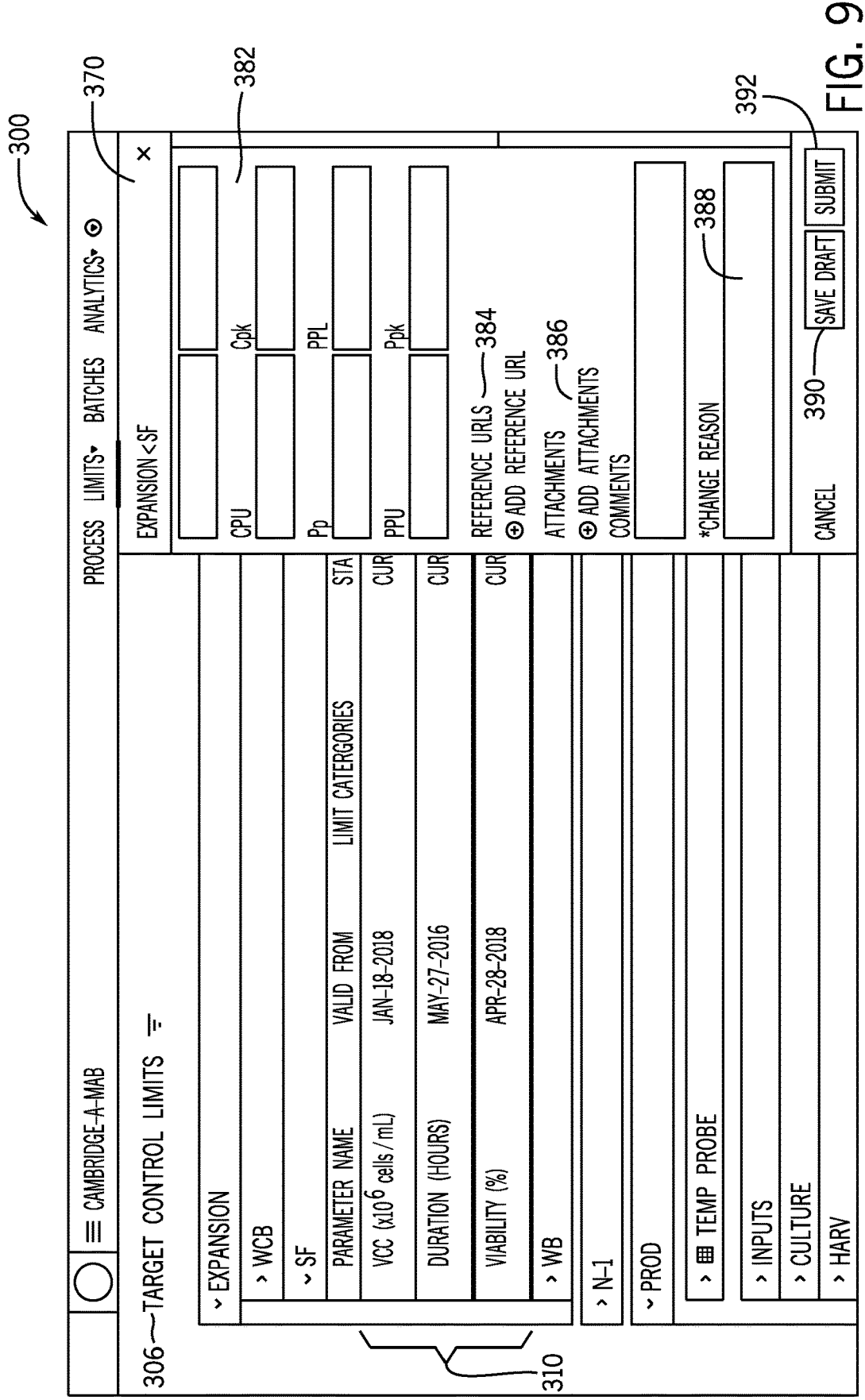
FIG. 9 illustrates a user interface to provide additional information related to the adjustments to either the specification limit data or the target control limit data.

A user can view this limit information in order to determine whether a limit value needs to be updated. A user can enter a new limit value by selecting on the most current limit. In FIG. 11, a circular icon 398 on the right may be selected to access a limit update menu 370. As shown in FIGS. 7-9, a limit update menu 370 may include various adjustable parameters 310. For example, a user can adjust the applicable sub-product 372, market 374, valid from date 376, valid through date 378, and limit values 382 for the new limit. For example, the new limit may only apply to a particular market 374. A user may input the date the limit value 382 was issued (e.g., by the regulatory authority or by the company) as the valid from date 376, meaning from that date forward the new limit applies. A user may input the valid through date 278 if there is a known date that the limit value 382 will no longer be applicable; however, a user may leave this value blank, indicating that the limit value 382 is currently valid. In the case where the valid through date 378 is left blank, it may be automatically updated when a new limit value is entered into the system 100, as discussed in more detail below. The new limit value 382 may be entered as an upper limit, a lower limit, or a range 286 including a minimum 282 and a maximum 284 value. The valid from 376 through valid through date 378 indicates the valid time interval 380 for the limit value 382.

After operation 252, the method 250 proceeds to operation 254, and the server receives a change reason or other verification or explanation. As shown in FIG. 9, upon entry of a new limit value 382, a user may input a change reason 388. This feature helps to ensures that changes are legitimate (e.g., due to regulatory or company-wide changes) and not arbitrary, as well as assist in documenting changes throughout the history of the production process. In conventional systems, such as Excel, limit changes, to the extent they are reflected in the system, are not tied to any particular reasoning, justification, or the like. As such, in some instances, temporary or accidental limit changes are not detected and propagate through the data.

The system may be configured to accept multiple formats of data, e.g., reference URLs 384 or attachments 386, and/or textual input to provide additional support to the limit change. For example, a user may provide a screenshot or URL from a website or database showing the regulatory authority that issued the limit change. As another example, the limit change may be listed in an article or a manual, which may be uploaded into the system 100. These features enhance legitimacy to the data validation process and facilitate compliance with any data collection standards imposed by a regulatory authority, as users can easily reference reasoning behind current limits and track history. After a user enters all relevant information related to the new limit, the user may either save the draft 390 (for example, if the user desires to input additional information) or may submit 392 the information.

After operation 254, the method 250 proceeds to operation 256, and the server 102 determines whether the change requires another user's approval. For example, either the type of change or the type of user who made the change may indicate a need for another user's approval before the change can be entered into the system. As one example, the type of change may trigger a need for approval regardless of the user that entered the change. For example, a change to a particular type of limit (e.g., a target limit, a specification limit, a warning limit, a control limit, an inner limit, and the like) may require approval from a second user. Whether or not approval is required for a particular change may vary based on an "Approvals Required" configuration setting. This setting may be adjusted based on user preferences.

As another example, the user's privilege level may indicate whether another user's approval is necessary. Users may have varying levels of authority within the system 100. For example, some users may have low level authority while other users may have high level authority. A user with high level authority may have a satisfactory or requisite privilege level to make a change automatically, while a user with low level authority may need another user's approval for a change. A low level authority may allow a user to review data within the system 100 and input new data for approval. A high level authority may allow a user to review data and input new data into the system 100, review new data input into the system by a low level user, and approve, unapprove, or deny new data input by the low level user. In some embodiments, a user may have varying levels of authority with respect to different limit categories or parameters. For example, a user may have authority to change either Target or Specification limits, but not both. A user with high level authority (e.g., manager or approval role) has a satisfactory privilege level, while a low level user does not. Users may establish an account in the system 100 with a username and password or other verification (e.g., biometric, or the like). The system 100 may associate a user's authority level with his or her username, identifier, account number, or the like. Based on the account accessing the system to input the change, the system 100 can determine the user's authority level and determine whether the user has a satisfactory privilege level, e.g., the system may reference a user's privilege level and then compare to a look up table of authorized privilege levels or titles to make automatic changes for limits. The privilege levels may vary based on limit type, parameter, process, and the like.

If another user's approval is not required (e.g., the user has a satisfactory privilege level), then the method 250 proceeds to operation 260 and the server 102 determines whether approval is granted. For example, if the high level user enters a new limit value with a change reason and hits submit, approval is implied, and the new limit value is accepted into the system 100. If the user's privilege is sufficiently high, but no reasoning is provided for the change, the system 100 may reject the change.

If another user's approval is required (e.g., the user does not have a satisfactory privilege level), then the method 250 proceeds to operation 258 and the system 100 transmits an approval request to an applicable user (e.g., a user who has a satisfactory privilege level or a user with administrative authority). For example, the system 100 may determine that an account is associated with a low level user who does not have a satisfactory privilege level or that a user is inputting a type of limit change that requires another user's approval. When the user submits a new limit value with a change reason, the system 100 sends an approval request to an account associated with a high level user. For example, the account may include an inbox and the system 100 may generate a message in the high level user's inbox. The message may include a button or link for the high level user to approve or decline the changed limit value. The high level user can review the changes, including the change reason and any reference URLs or attachments, and determine whether to approve or decline the limit change.

After operation 258, the method 250 proceeds to operation 260 and the system 100 determines whether approval is granted. The system 100 receives input from the high level user either approving or rejecting the limit change. The input may be in the form of a message, a button selection, a check mark, or the like. Additionally or alternatively, the system 100 may analyze the input reasoning data from the approval request to validate the change. For example, for some parameters, the system may analyze the new limits for possibility or other benchmark features that would identify a typographical error or other input error. As another example, the system 100 may analyze the approval request to ensure a comment is included or certain parameters may require additional supporting documentation to change (e.g., regulatory values may require links to corresponding regulations), or the like. As such, operation 260 may include both a user confirmation assessment, as well as formatting, checklist items, or the like, as part of the analysis before designating an approval.

If approval is not granted, then the method 250 proceeds to operation 262 and the new limit value is rejected, and the method 250 terminates. For example, when the high level user rejects the limit change, the new limit value is not input into the system 100 and is instead discarded. A message may be sent back to the low level user (if the limit change was initially input by a low level user) indicating that the change was rejected.

If approval is granted, then the method 250 proceeds to operation 264 and the validity interval is determined. The system 100 generates the validity interval based on the valid from date to the valid through date input by the user. If the valid through date is blank, then the validity interval extends to the current date. The validity interval is associated with the limit and is stored as metadata associated with the limit.

After operation 264, the method 250 proceeds to operation 266 and the new limit value is stored as a new limit value entry. For example, the new limit value may be stored in the limit storage database 274 or 604. In this example, both the new limit value 286 and the validity interval 280 are stored. The new limit also populates a new limit entry for the particular parameter on the user interface. For example, as shown in FIG. 11, a new limit entry 396 would generate below the third limit entry 396c. In this example, if the limit was changed for the U.S. market, the new limit entry 396 would show Market: USA and its status would be current with the valid from date input by the user. If for some reason it is determined that a value for a new limit is incorrect after it has been approved and/or entered into the system 100, the limit may be unapproved by a high level user (e.g., one with an administrative role) so that the limit information (e.g., value and/or valid time interval) can be revised or corrected and resubmitted for approval.

After operation 266, the method 250 proceeds to operation 268 and the status of the prior limit is updated. In the example discussed above with reference to FIG. 11, the system 100 would change the status of the prior third limit entry 396c from Current to Obsolete upon entry of the new limit. Instead, the new limit would have the status Current. The prior third limit entry 396c would also generate a valid through date on the date prior to the valid from date of the new entry. For example, if the new entry has a valid from date of 1 Jan. 2019, the prior third limit entry 396c would generate a valid through date of 31-Dec-2018. In this manner, the limits do not have any overlapping validity interval. After operation 268, the method 250 terminates.

Figure 20:
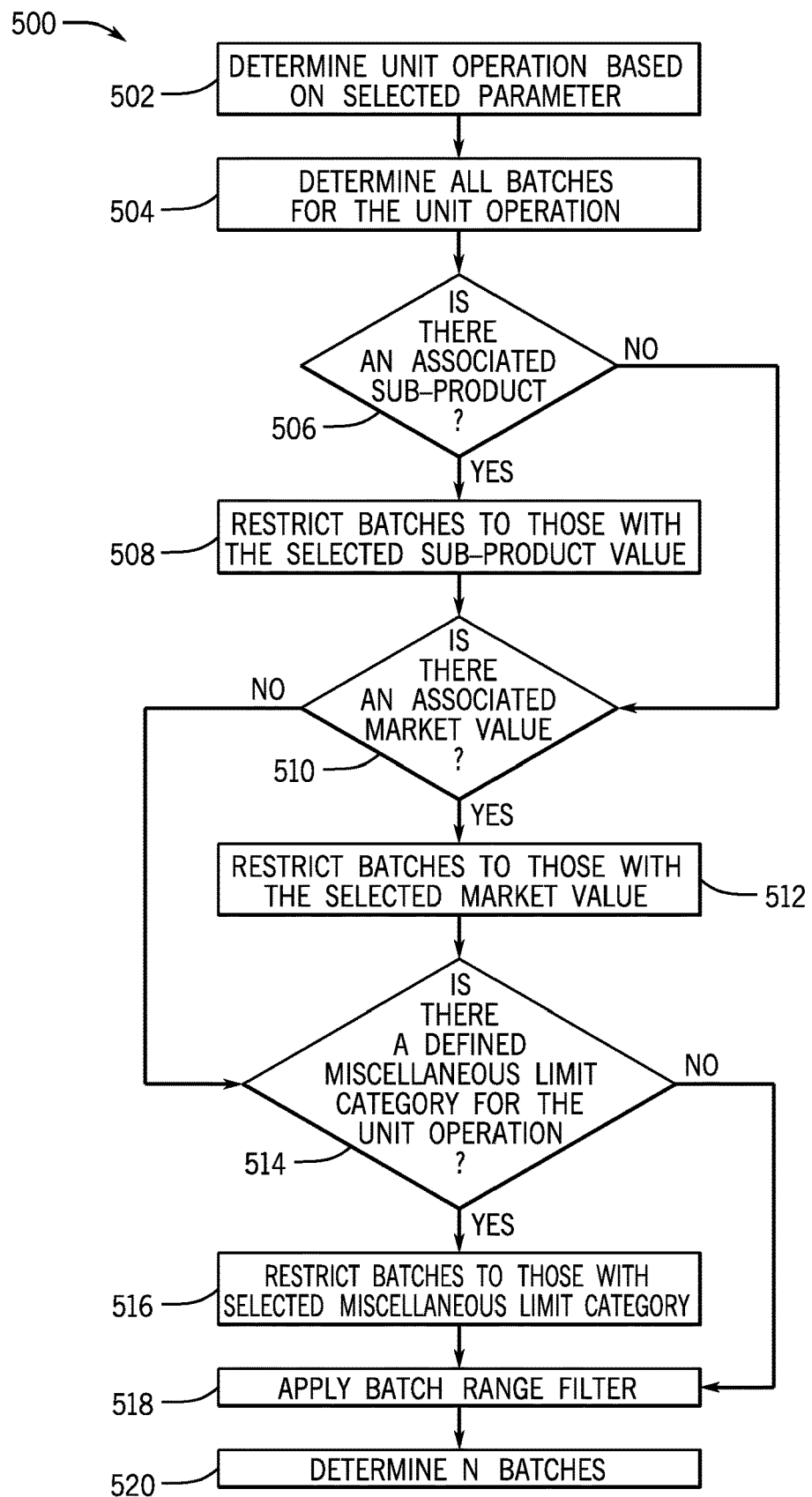
FIG. 20 is a flow chart illustrating a method for batch filtering.
Figure 21:
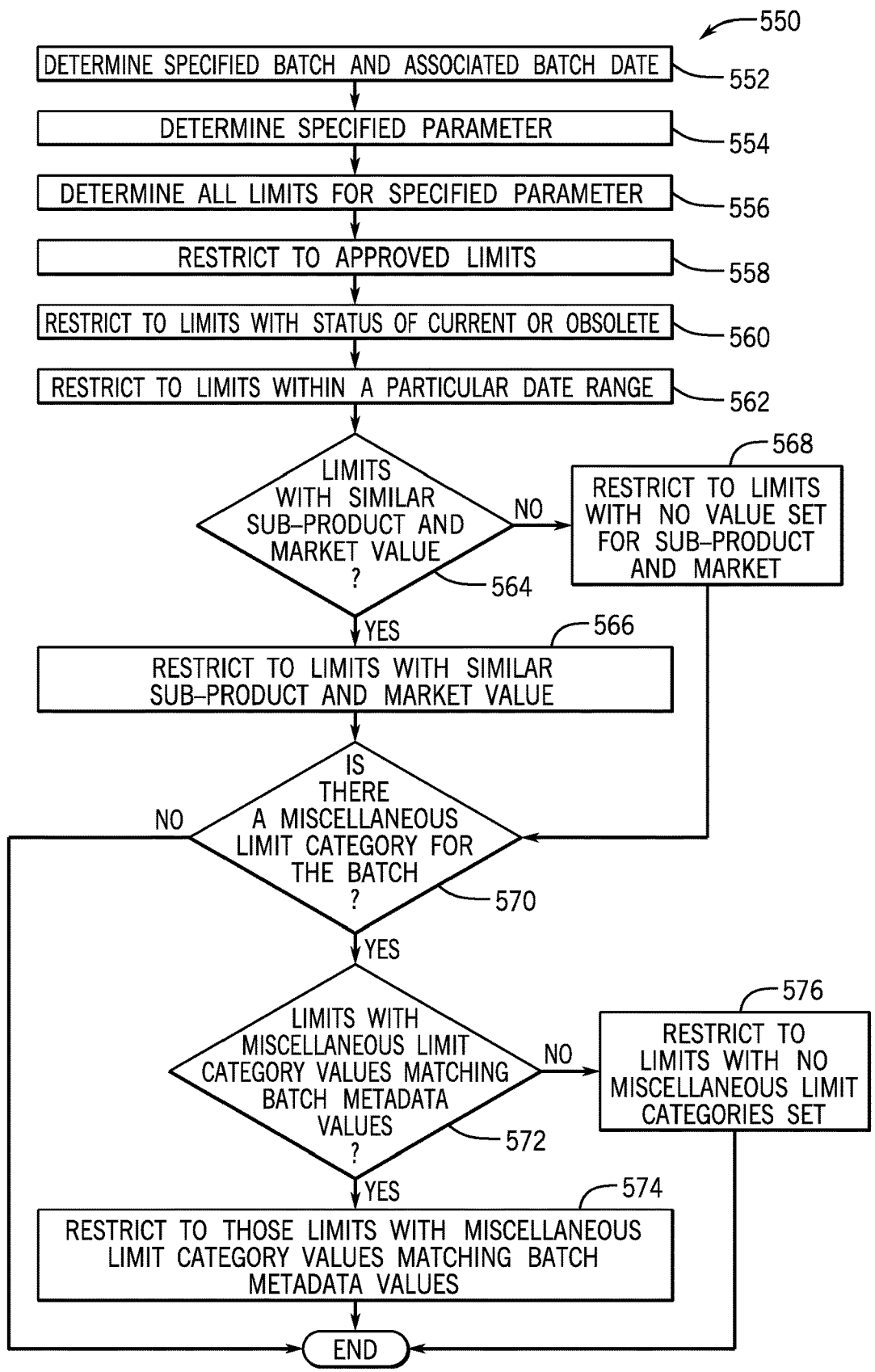
FIG. 21 is a flow chart illustrating a method for limit filtering.

In several embodiments, a processing element 152, such as one executing on a server or in a cloud based network, executes one or more algorithms to determine batches and limits for one or more specified parameters. Batch and limit filtering by the system 100 assists users to more quickly sort hundreds to thousands of batches and limits when attempting to analyze a particular selection of batches and limits. As shown in FIG. 20, the processing element 152 may execute an algorithm having a method 500 for batch filtering. The method 500 begins with operation 502 and the unit operation is determined based on a selected parameter. For example, a selected parameter may be temperature, pH, viscosity, or the like. The unit operation is the broadest category applicable to a set of batches. For example, the unit operation may be a product, a process, or some other experimental or manufacturing related factor to be tested. A list of exemplary unit operations 308 is shown in FIG. 7. Each of these unit operations 308 may be defined by a user.

After operation 502, the method 500 proceeds to operation 504 and the batches associated with the unit operation are determined. For example, a unit operation that is a product may have several batches produced over time as the product is manufactured. Any batch associated with that particular product can be determined at operation 504. After operation 504, the method 500 proceeds to operation 506 and the processing element 152 determines whether there is an associated sub-product (e.g., whether a user has selected one or more values from a sub-product list). The numerous batches associated with a unit of operation may vary in sub-product. A sub-product may be any variation in a product. For example, the concentration of a particular ingredient or drug may be varied slightly, producing different sub-products. As another example, the packaging or casing of the product may be varied (e.g., a drug may be in pill form as one sub-product and in liquid form as another sub-product). As yet another example, the size of the product may be varied as different sub-products. A user may input a sub-product or leave the sub-product blank when inputting the batch information. If a sub-product has been input, then the batch has an associated sub-product. As shown in FIG. 13, the sub-product 358 associated with the particular batch 352 displayed is a 75 mg/mL vial.

If it is determined at operation 506 that there is an associated sub-product (e.g., that a user has selected one or more values within a sub-product list), the method 500 proceeds to operation 508 and the batches are restricted to batches with the selected sub-product value. For example, if the system 100 were filtering for the batch MAB_020 352 shown in FIG. 13, the system 100 would determine there is an associated sub-product 358 and restrict to batches with the sub-product 358 (e.g., a 75 mg/mL vial). Any batch that does not have the same sub-product value (e.g., 75 mg/mL vial) is filtered out.

After operation 508, the method proceeds to operation 510 and the processing element 152 determines whether there is an associated market value (e.g., whether a user has selected one or more values within the market list). If it is determined at operation 506 that there is no associated sub-product, the method 500 proceeds directly to operation 510. The various batches stored within the system 100 may have different applicable markets (e.g., U.S., Europe, Canada, etc.). For example, batches may be produced with a particular market in mind, and the market may be input into the batch data when the batch is input into the system 100. As shown in FIG. 13, the particular batch 352 displayed is associated with the U.S. market 360.

If it is determined at operation 510 that there is an associated market value (e.g., that a user has selected a market value from the list), the method 500 proceeds to operation 512 and the batches are restricted to batches with the selected market value. For example, if the system 100 were filtering for the batch MAB_020 352 shown in FIG. 13, the system 100 would determine there is an associated market 360 (USA) and restrict to batches with the market in the U.S. Any batch that does not have the same market (USA) is filtered out.

After operation 512, the method proceeds to operation 514 and the processing element 152 determines whether there is a miscellaneous limit category (e.g., a Target Limit Category) for the unit operation (e.g., whether a user has selected one or more values within the miscellaneous limit category). If it is determined at operation 510 that there is no associated market value, the method 500 proceeds directly to operation 514. A miscellaneous limit category may include any additional miscellaneous differences between batches. For example, batches may differ based on circumstances surrounding the batch, such as, for example, different testing environments, equipment used, and the like. Limit values may vary for each batch based on these miscellaneous differences. As one example, different equipment may result in varying limit values. For example, different equipment may have different efficiency, sterility, capacity, and the like. An optimal limit for a product or process that uses different equipment may vary based on the physical capabilities of the equipment. In this example, equipment type or ID may be a miscellaneous limit category. A miscellaneous limit category may be user-defined or otherwise reserved for new types of limits. For example, a user may input a category label (e.g., equipment type) and desired parameters for the category. The system 100 determines whether batches exist that have the specific category label input by the user and/or the desired parameters for the category.

If in operation 514 there is a defined miscellaneous limit category for the unit operation, the method 500 proceeds to operation 516 and the batches are restricted to batches with the selected miscellaneous limit category and associated value. For example, if a user input a category "Equipment" as a miscellaneous limit category and input "steel" as a value, then the system would restrict the batches to those that have steel Equipment input into the batch information. Any batch that does not have steel Equipment is filtered out.

After operation 516, the method 500 proceeds to operation 518 and a batch range filter is applied. If it is determined at operation 514 that there is no defined miscellaneous limit category for the unit operation, the method 500 proceeds directly to operation 518. The batch range filter filters batches based on dates. For example, the batch range filter can filter batches based on the last N batches produced, the batches produced from the last N days (or weeks, months, or other period of time), or batches within a particular date range. After operation 518, the method 500 proceeds to operation 520 and N batches is determined. Any batches produced during the selected time frame are selected, while batches produced outside the selected time frame are filtered out. The result is a particular number, N, of batches selected.

As another example, the processing element 152 may execute an algorithm having a method 550 for determining associated limits for a given batch with a specified parameter. The algorithm can apply to both Target limits and Specification limits. The method 550 begins with operation 552 and the specified batch and associated batch date are determined. Batches may be collected over time, such that each batch may have a respective date when it was sampled. For example, as shown in FIG. 13, the batch MAB_020 352 has a batch date 354 of 16 Nov. 2018 15:13. After operation 552, the method 550 proceeds to operation 554 and the specified parameter is determined. A batch may have one or more associated parameters. Each parameter may have different limits and values associated with it. A user may select a specific parameter that the user desires to monitor for data compliance. For example, a user may select temperature, pH, toxicity, and the like, depending upon the parameter the user desires to review.

After operation 554, the method 550 proceeds to operation 556 and all limits for the specified parameter are determined. Each parameter has one or more limits associated with it and may have one or both of Specification limits and Target limits. At operation 556, the processing element 152 determines all Target limits, all Specification limits, or both. After operation 556, the method 550 proceeds to operation 558 and only Approved Limits are selected, while pending, draft, and rejected limits are filtered out. In other words, only limits that have been previously approved by a user with a specified privilege level are selected.

After operation 558, the method 550 proceeds to operation 560 and only limits with a status with current or obsolete are selected. For example, as shown in FIG. 10, a user can filter by status 394 by selecting on the desired status (e.g., current and obsolete) to display and selecting off the status (e.g., future, draft, pending, and rejected) to hide. Only limits that are current (e.g., have no valid through date) or obsolete (e.g., have a valid through date in the past) will be displayed.

After operation 560, the method 550 proceeds to operation 562 and only limits within a particular date range are selected. For example, if a user desires to review current limits, a user may select limits with a target "valid from" date on or before the batch date and with no "valid through" date. As another example, if a user desires to review obsolete limits, a user may select limits with a target "valid from" date on or before the batch date and with a "valid through" date on or after the batch date. In either case, the selected date range includes the batch date in order for the limit to apply to the particular batch.

After operation 562, the method 550 proceeds to operation 564 and the processing element 152 determines whether there are limits with similar sub-product and market values. For example, if the batch has both sub-product and market values associated with it, then the processing element 152 determines whether there are one or more limits with the same two established values as those in the batch. As another example, if the batch has a sub-product value but no market value, the processing element 152 determines whether there are one or more limits with the same sub-product value and no set market value. As an additional example, if the batch has a market value but no sub-product value, then the processing element 152 determines whether there are one or more limits with the same market value and no set sub-product value. As yet another example, if the batch has no sub-product value or market value, then the processing element 152 determines whether there are one or more limits with no sub-product value or market value.

If there are limits with similar sub-product and market values, the method 550 proceeds to operation 566 and the limits with such values are selected. If there are no limits with similar sub-product and market values, then the method 550 proceeds to operation 568 and limits with no value set for sub-product and market are selected. After either operation 566 or operation 568, the method 550 proceeds to operation 570 and the processing element 152 determines whether there is a miscellaneous limit category for the batch. Miscellaneous limit categories may be defined by unit operation or by individual batch. For example, a single unit operation may have a defined miscellaneous limit category that applies to all batches within the unit operation. For example, a unit operation may have a miscellaneous limit category "Equipment" and all batches have a value set for "Equipment." Alternatively, batches may each have their own defined miscellaneous limit categories.

If there is no miscellaneous limit category for the batch, then the method 550 ends. This is a typical path when the applicable limit is a Specification limit, as opposed to a Target limit. If there is a miscellaneous limit category for the batch, then the method 550 proceeds to operation 572 and the processing element 152 determines whether there are limits with miscellaneous limit category values matching batch metadata values. As an example, a user may define one or more miscellaneous limit categories and values for various limits stored in the system 100. In this manner, such limits may be associated with batches having a particular value for the defined miscellaneous limit category. For example, batches may have a value of "steel" for the "Equipment" miscellaneous limit category. Certain limits may only apply to batches that were sampled on steel equipment. If there are limits with such matching values, then the method 550 proceeds to operation 574 and such limits are selected and the method 550 ends. If there are no limits with such matching values, then the method 550 proceeds to operation 576 and limits with no set miscellaneous limit categories are selected and the method 550 ends.

A system of the present disclosure may include one or more alerts or user notifications that provide select information to a user, the information may be provided in real time as data is received and analyzed by the system. For example, alerts may provide information on data values input into the system for various parameters or characteristics related to a batch. An alert may provide real time feedback to a user related to new data input into the system. For example, an alert may provide real time feedback of a value failing to comply with one or more limits or violating one or more rules, and/or as new data values are entered into the system. The alert functionality allows a user to easily monitor the progress and performance of a batch, without having to constantly monitor the database. The alerts also can identify issues within a batch run quickly, such as a particular parameter failing a limit, that allows the user to work to correct chemical, mechanical, and/or electrical issues during the process run that can help to "save" the batch. Conventional data tracking and compliance systems do not include alert functionality, such that users must constantly check the database, preventing a user from monitoring multiple batches simultaneously and/or achieving other work functions while still monitoring a batch.

Figure 23:
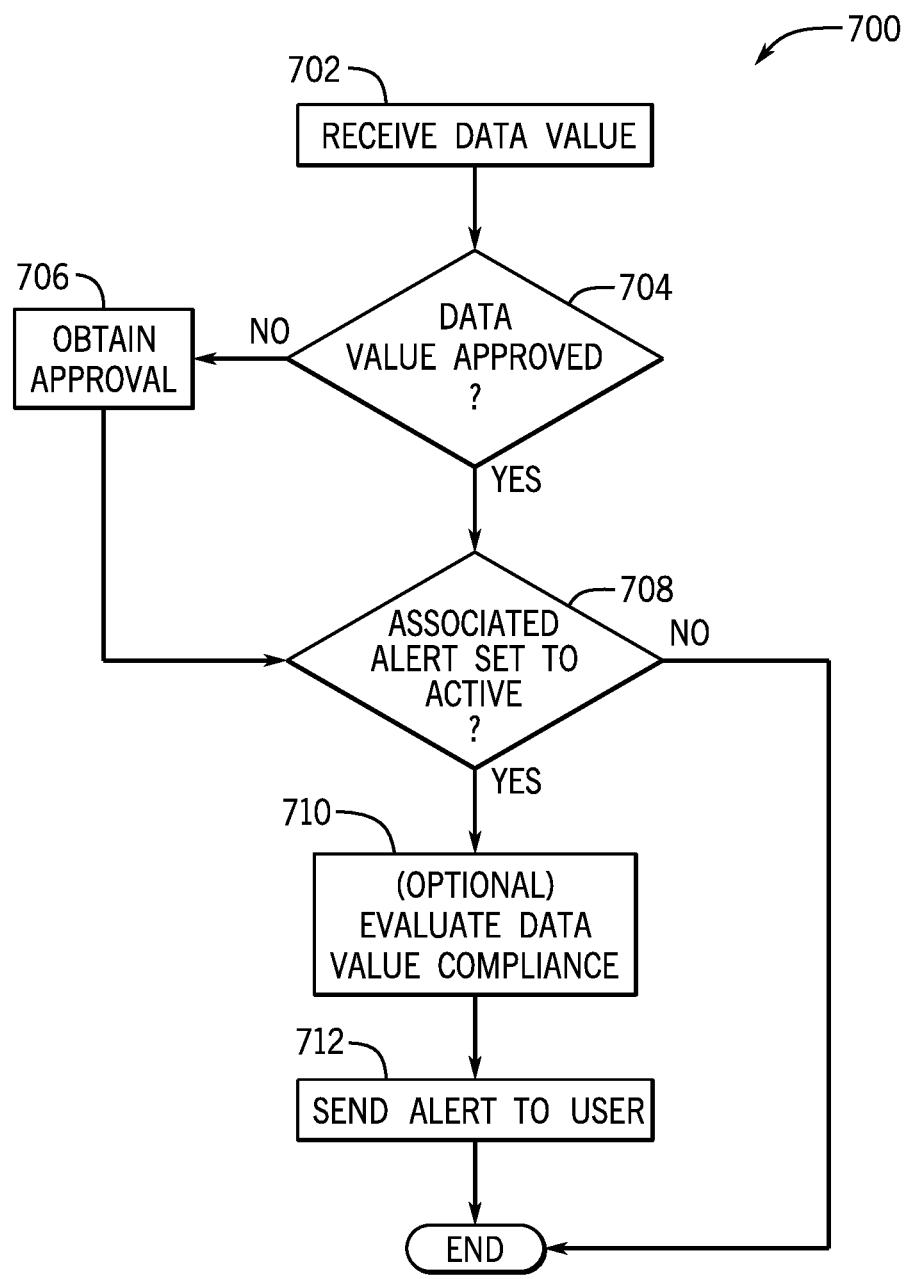
FIG. 23 is a flow chart illustrating a method for sending an alert to a user.

FIG. 23 is a flow chart illustrating a method 700 for utilizing the system 100 to activate and transmit alerts to a user, such as to one or more user devices. The method 700 may be stored as an algorithm or programming instructions in memory and executed by a processing element or the like. The method 700 begins with operation 702 and a data value is received into memory, such as by being entered in the system, such as described with respect to FIG. 6 in operation 202 of method 200, which may be manually, automatically, or some combination of the two. For example, a data value may be received directly from a computing or other device (e.g., instrument or sensor) or from a user inputting the value into the system, e.g., by a user device 106, or retrieved from a database. The data value may correspond to one or more parameters for a batch detected or tracked during a batch run.

After operation 702, the method 700 proceeds to operation 704 and the system determines whether the data value has been approved. For example, certain data may be automatically approved as it is entered, while other data may require approval by a user with a satisfactory privilege level. For example, the system may determine whether another user's approval is required in a similar manner as described with respect to FIG. 4 for changes entered into the system, e.g., at operation 256 of method 250. As another example, certain data (e.g., parameters) may be configured to be automatically approved. For example, a user (e.g., an administrator) may configure the system to not require approval for certain data (e.g., by setting the data to auto-approve, not marking the data as requiring approval, or the like). When the system determines the data value entered into the system does not require approval, the data is automatically approved. The system may store such configurations in memory for use when analyzing approval of new data entered into the system. For example, the system may store a pre-defined list of approved data, data that does not require approval, and/or data that requires approval. In some instances, data may be approved based on its value fitting within a particular value range or being above or below a certain threshold value, based on the parameter, based on the user entering the value (e.g., privilege level), and the like.

In some embodiments, data may be approved, either automatically or by a user, if the data complies with the requisite parameter-level configuration. For example, a particular parameter may be a numerical value or a text value. In this example, for data to be compliant, the data value must be a numerical value or a text value, respectively. For example, if the data is configured as a number, then text cannot be entered, or if the data is configured as text, then a number cannot be entered. In these examples, if text is entered when a number is required, then the parameter-level configuration is violated. As another example, a pre-defined list of valid values for a particular parameter may be stored by the system. In this example, if the data falls within the pre-defined list of valid values, then the data is compliant with the parameter-level configuration; however, if the data falls outside the pre-defined list of valid values, then the parameter-level configuration is violated. In these examples, if the parameter-level configuration is violated, data cannot be approved. For example, data that would otherwise be automatically approved will not be approved if the parameter-level configuration is violated. Alternatively, if an approval is not required and the data does not violate the parameter-level configuration, the data will be automatically approved.

If the data value has not been approved, then the method 700 proceeds to operation 706 and approval is obtained for the data value. For example, if the data value requires approval and the value does not violate the parameter-level configuration, then the data is set to pending (e.g., needs approval from a user). For example, the server may send an approval request to a user with a satisfactory privilege level (e.g., an administrator).

Figure 24:
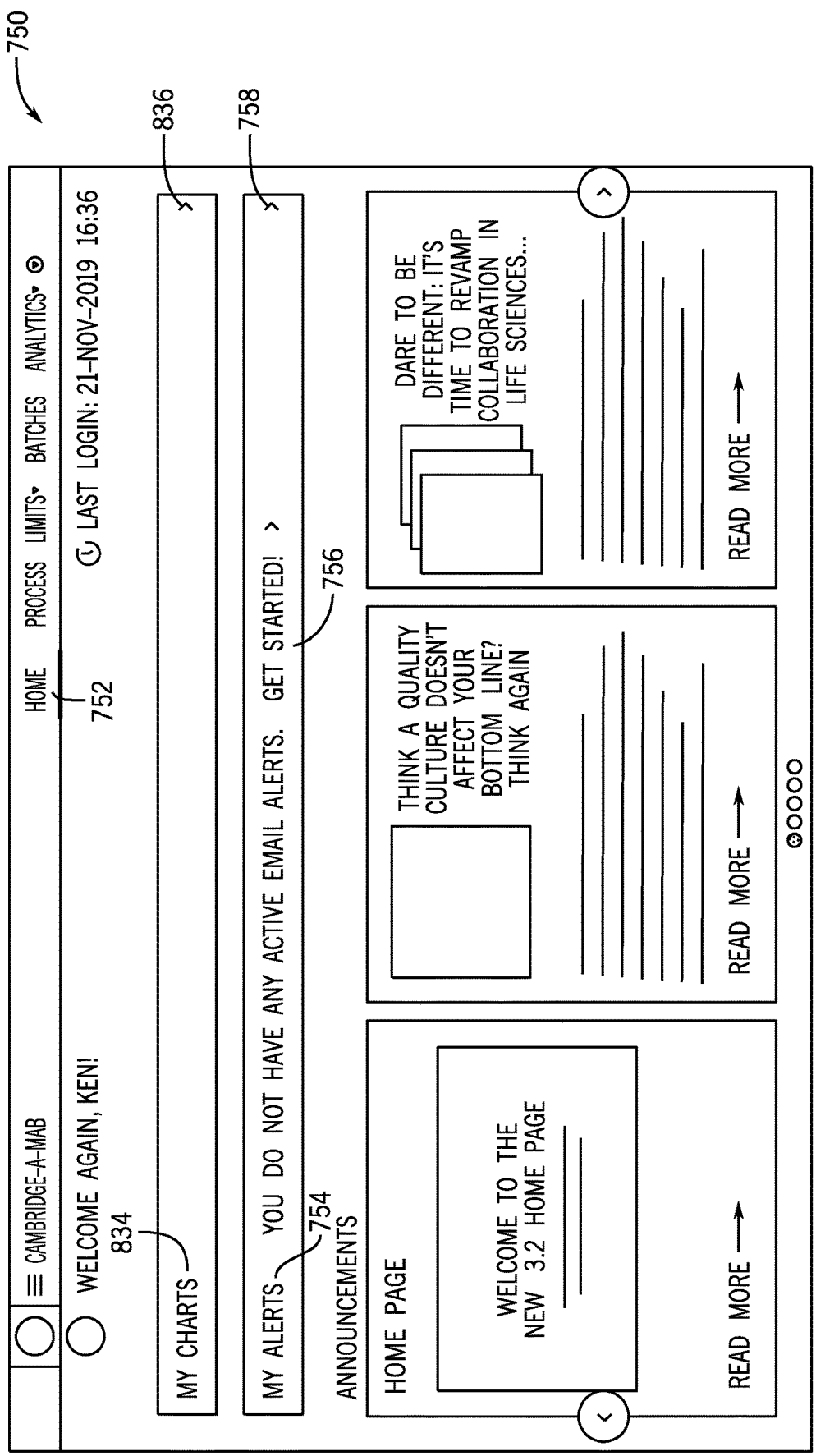
FIG. 24 illustrates a user interface displaying a home screen that provides access to a user's alert preferences.
Figure 25:
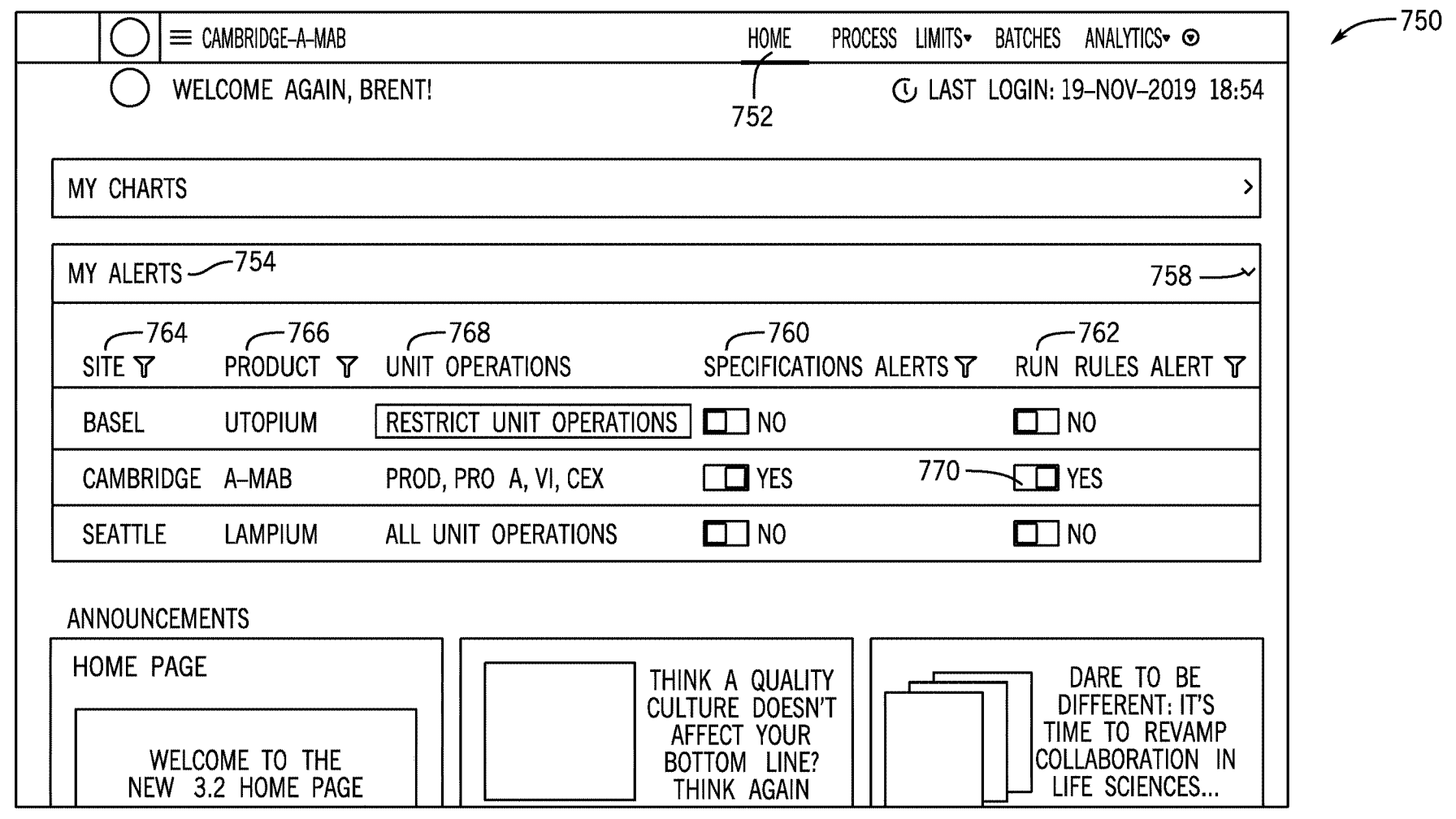

If the data value is approved, either at operation 704 or operation 706, the method 700 proceeds to operation 708 and the server determines whether an alert associated with the approved data value is set to active. A user may be able to configure one or more alerts through a user interface. For example, FIGS. 24-28 show exemplary user interfaces for customizing alerts in the disclosed system. As shown in FIG. 24, the user interface 700 includes a home screen 752 that provides access to a "My Alerts" tab 754. The "My Alerts" tab 754 provides the user information on active alerts. For example, as shown, there are no active email alerts set up for the current user. The user can select a link 756, labeled "Get Started", and/or an access tab 758, on the "My Alerts" tab 754 to set up desirable alerts. For example, FIG. 25 shows the "My Alerts" tab 754 opened by selecting the access tab 758 such that a user can customize one or more alerts.

Alerts may be created by select users with defined privileges, e.g., in some instances alerts may be created only by a parameter manager or system administrator. For example, a parameter manager may have special system privileges that allow access to a restricted user interface that enables the parameter manager to establish alerts for different circumstances. For example, the parameter manager may set up one or more alerts for one or more categories, e.g., based on site, product, batch, batch date, unit operation, parameter, rule violation, limit violation, etc. For example, an alert may be configured to be sent to a user when the data value received is from a specific site where a batch is run, is received during a particular window of time, is for a particular parameter, violates one or more rules, exceeds one or more limits, or the like.

In several embodiments, the creation of alerts may be governed by the process definition configuration (e.g., configured at the parameter level) and may be included in metadata for the parameter. For example, FIGS. 26-28 show an exemplary user interface for a user (e.g., parameter manager) to customize alerts through the Process Definition screen 772. For example, the user can select the process tab 774 to access the Process Definition screen 772. A user can customize various analytics and alerts for different parameters. For example, as shown in FIG. 26, by selecting a parameter 776, a user can access a process definition box 778 for the parameter 776. As shown, the process definition box 778 includes an Analytics tab 780 and an Alerts tab 782. In FIG. 26, the Analytics tab 780 is selected, which allows the user to customize one or more rules and/or limits. In other words, a user can select which rules or limits the user wants applied to a particular parameter. The rules or limits in the process definition for a parameter may have been previously set up (e.g., by a parameter manager or system administrator). For example, as shown in FIG. 26, Rules 784 1-5 and Specification Limits 786 1-2 have been previously set up in the system and are adjustable by a user. As shown, the user can customize one or more rules 784 for an individual's chart 788 and/or an MR chart 790 by turning the rules 784 on or off via toggles 792, buttons, or another selection mechanism. The user can further customize one or more specification limits 786, by selecting options from a drop down bar 794. As shown in FIG. 27, the user has turned on Rules 784 1 and 2 by moving the toggles 792 to the right and has selected "Action" from the drop down bar 794 for Specification Limit 786 1 for parameter 776 SCR. The user may select the save button 796 to save the customized Analytics 780 settings.

FIG. 28 shows the Alerts tab 782 selected, which allows the user to customize one or more alerts for the selected parameter 776. A user can turn alerts on or off for a selected parameter. As shown, a user can turn on active alerts 800 for the selected parameter 776 by moving a toggle 798 (or selecting a button or other selection mechanism). When the Active Alerts are turned on, the system determines whether one or more alerts are associated with the parameter. If an alert is associated with the parameter, the system stores the alert information in a database, e.g., as metadata associated with the parameter. As shown in the exemplary Alerts tab 782, a user can customize alerts by chart type 802 (e.g., Individuals or I-MR), batch range 804 (e.g., receiving alerts for the last X number of batches), sub-product 806, and/or market 807. Other alert customizations are contemplated, for example, alerts may be established based on parameter classes (e.g., CPP (Critical Process Parameters)), CQA (Critical Quality Attribute), and the like. The user may select the save button 808 to save the customized Alerts 782 settings.

Figure 32:
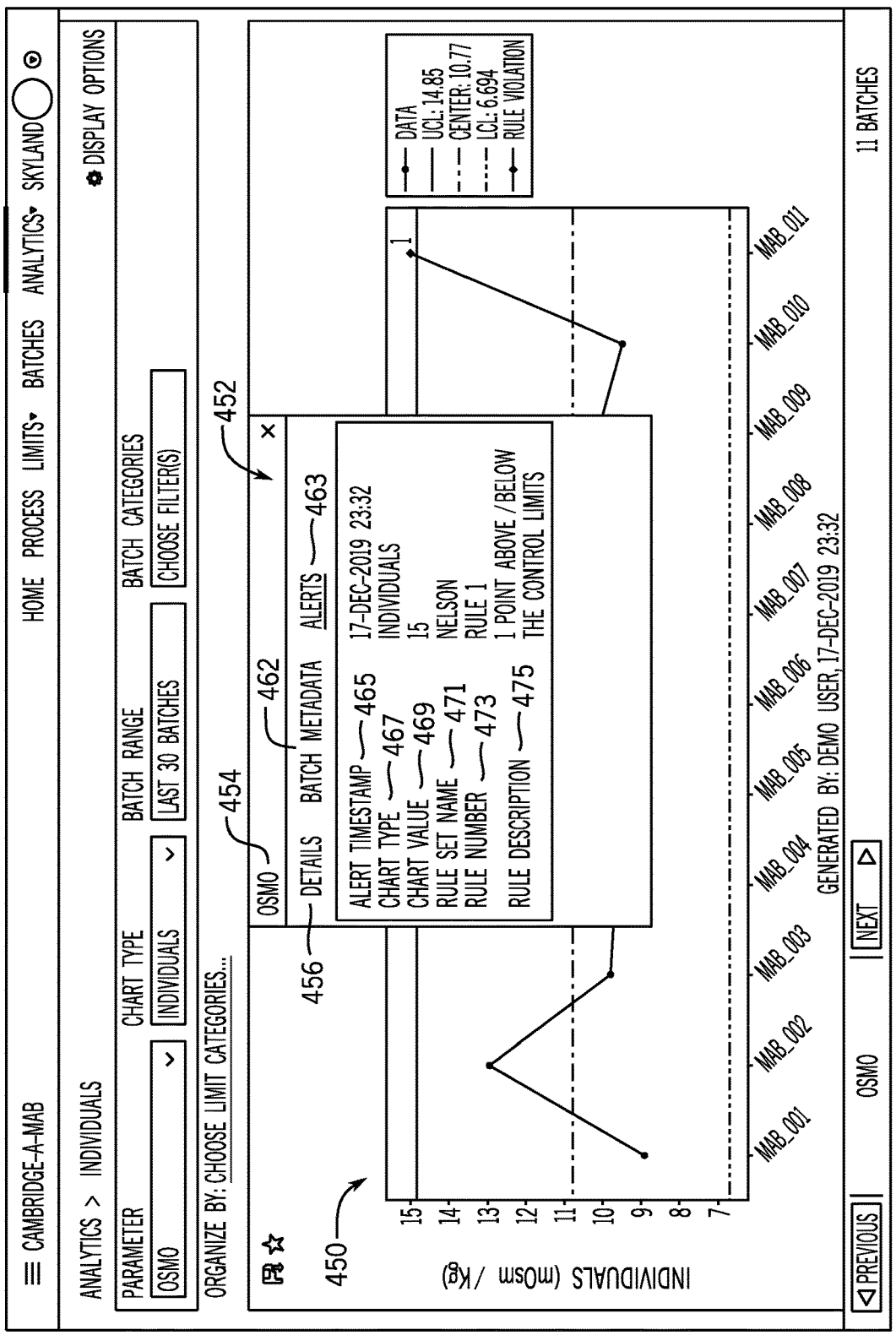
FIG. 32 illustrates the user interface of FIG. 22 displaying an interactive control chart with a graphic for displaying alert metadata associated with a data point.

As shown in FIG. 32, a user may view alert information associated with a parameter through an interactive output control chart displayed on a user interface 300, e.g., as discussed with respect to FIG. 22. As shown, the control chart 450 includes interactive data points that have metadata viewable by hovering a cursor over and/or selecting the data point. As shown, when a user hovers over or selects a data point, the system displays a text box or graphic 452 that provides information related to the data point. The graphic includes tabs "Details" 456 and "Batch Metadata" 462, as discussed with respect to FIG. 22, as well as tab "Alerts" 463. In this example, the Alerts tab 463 is selected, displaying alert information associated with the selected data point for the parameter 454 Osmo. In this example, the alert information includes an Alert Timestamp 465 (e.g., indicating a time the alert was sent), a Chart Type 467, a Chart Value 469, a Rule Set Name 471, a Rule Number 473, and a Rule Description 475, each of which are associated with the particular alert that was set for the parameter 454 Osmo, e.g., as discussed with respect to FIGS. 26-28.

A user can subscribe to or activate different alerts based on user preferences. For example, a user may only desire to receive alerts for particular products, and may activate the alerts for those products. As one example, the user may wish to receive limit alerts and/or rules alerts for the particular product, and may activate the alerts for such circumstances. The system may store user preferences individually (e.g., store as preferences for a user account specific to the user) and/or may store a list of users (e.g., an email list) that subscribe to each alert. In some embodiments, an administrator or system manager may assign alerts to one or more users, subscribing them to the alerts. In these embodiments, the users assigned to the alerts may, in some instances, turn the alerts on or off, depending on individual user preferences.

As shown in FIG. 25, a user may subscribe to or activate different alerts via the home screen 752 and "My Alerts" tab or bar 754. By selecting the access tab 758, a user may view one or more customizable alerts. The alerts accessed by the access tab 758 may include a list of alerts created by the parameter manager, alerts the user has subscribed to, and/or alerts assigned to the user. In the example shown in FIG. 25, a user can turn on (activate) or off (deactivate) specifications alerts 760 and/or run rules alerts 762 for different sites 764, products 766, and unit operations 768. A user may turn on alerts for all unit operations 768 or a subset of unit operations 768. As shown, a user can turn the alerts on and off via a toggle 770; however, other selection mechanisms are contemplated (e.g., a button). In the depicted example, the user has moved the toggle 770 to the right to turn on both the specification alerts 760 and run rules alerts 762 for product 766 A-Mab produced at the Cambridge site 764 that is associated with the subset of Unit Operations 768 including Prod, ProA, VI, and CEX. The other alerts are turned off by leaving the toggle 770 to the left. As such, the user may only receive alerts for the activated alerts (e.g., activated unit operations). In some embodiments, a user may customize the format and/or destination of an alert. For example, a user may prefer to receive alerts or notifications via email, text, a website link, or the like. Alternatively, the format and/or destination of an alert may be customized by the system administrator.

With continued reference to FIG. 23, if the server determines at operation 708 that no active alert is associated with the approved data value, the method 700 ends. If the server determines at operation 708 that an active alert is associated with the approved data value (e.g., based on the user's saved alert preferences), the method 700 optionally proceeds to operation 710 and the server evaluates compliance of the approved data value based on select analytics. In instances where the alert is associated with an analytic, such as a rule violation or compliance with a limit, the server evaluates whether the approved data value violates the applicable rule or complies with the applicable limit. For example, as shown in FIG. 27, Rule 1 and Rule 2 are activated analytics. In this case, when the user activates rules alerts, the user will receive alerts for Rules 1 and 2. In this example, at operation 710, the server evaluates compliance of the approved data value with Rules 1 and 2, e.g., whether either rule is violated. As another example, the server may evaluate compliance of an approved data value with one or more limits.

Figure 29:
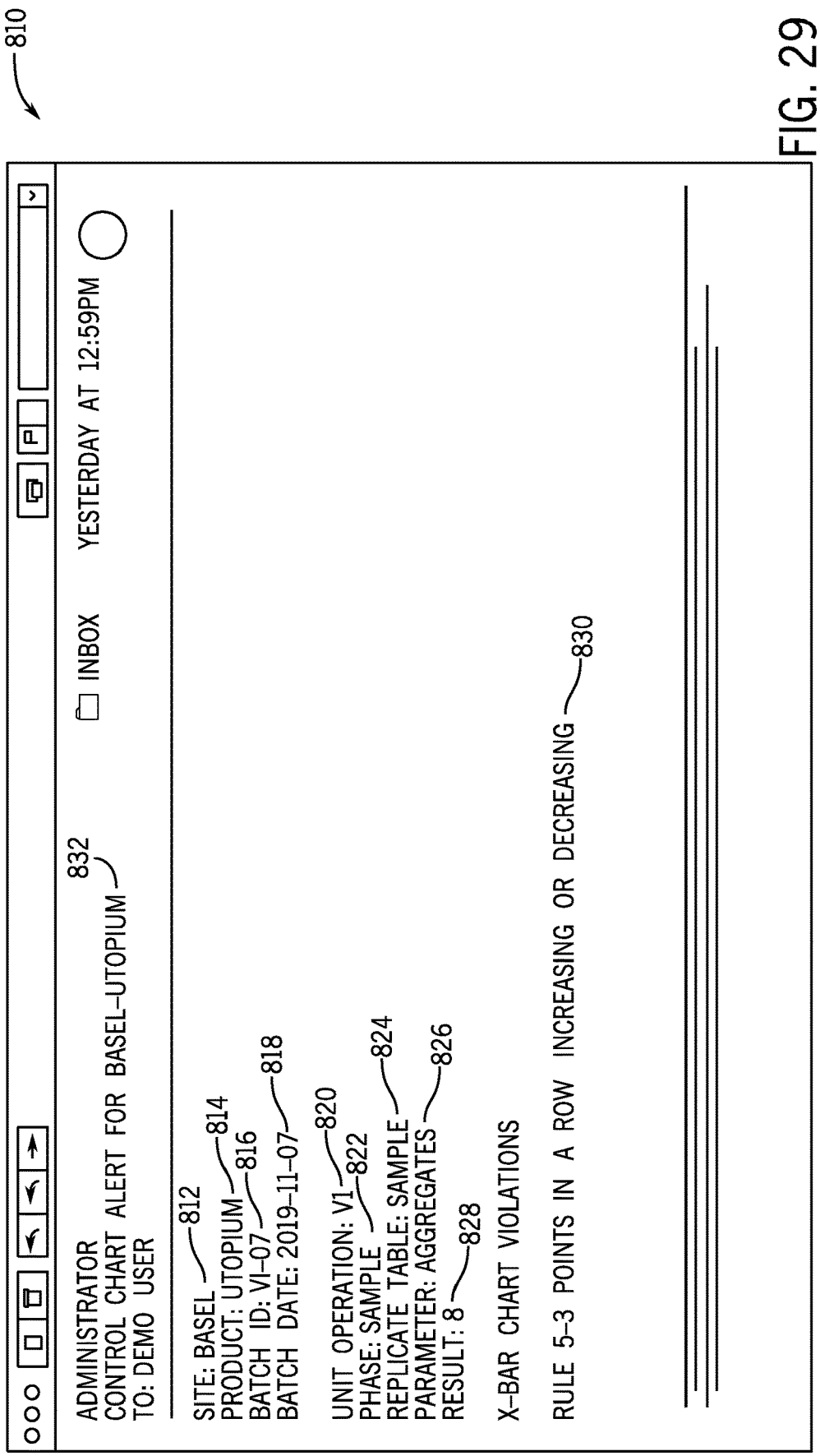
FIG. 29 illustrates an exemplary alert sent by a system of the present disclosure to a user.

After operation 708, or optionally after operation 710, the method 700 proceeds to operation 712 and an alert is sent to a user. For example, an alert may be an email, text message, application notification, and the like. FIG. 29 shows an example email alert 810 sent to a user device 106 by the server based on activated alerts. An alert may be sent to any user that subscribed to the particular alert. In some embodiments, alerts may also be sent to an administrator, who may, in some instances, selectively subscribe to alerts. The alert may provide various information on a received data value. For example, the alert may provide product, process, and batch information. In instances where the server evaluated compliance of the data value (e.g., as determined at operation 710), the alert may also include information on compliance of the received data value. As shown in FIG. 29, the email alert 810 provides information on the site 812, product 814, batch ID 816, batch date 818, unit operation 820, phase 822, replicate table 824, parameter 826, result 828, and rule violations 830 for a particular received data value. The subject line 832 of the email alert 810 may indicate the type of alert. As shown, the type of alert is a control chart alert for the site Basel regarding the product Utopium. The email alert 810 indicates to the user that Rule 5 (3 points in a row increasing or decreasing) has been violated for the product Utopium at the Basel site for batch VI-07 recorded on 2019 Nov. 7. In this example, the user has subscribed to alerts for rule violations (e.g., a violation of Rule 5). While the present example shows the alert providing textual information, it is contemplated that the information may also be provided as a chart (e.g., a chart described herein) or a data table.

Figure 30:
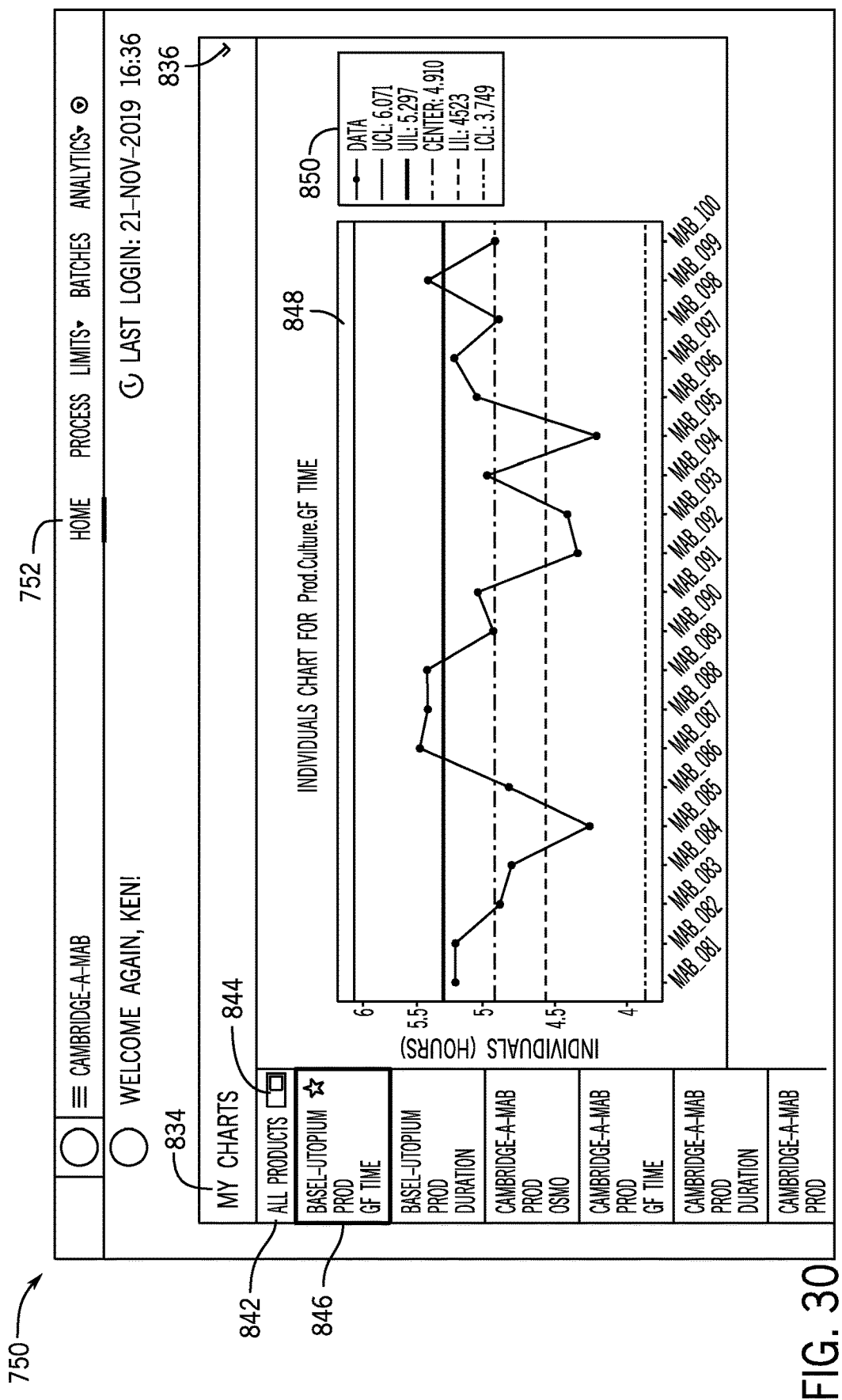
FIG. 30 illustrates the user interface of FIG. 24 displaying the home screen with a quick access charts tab open for quick access to subscribed charts.
Figure 31:
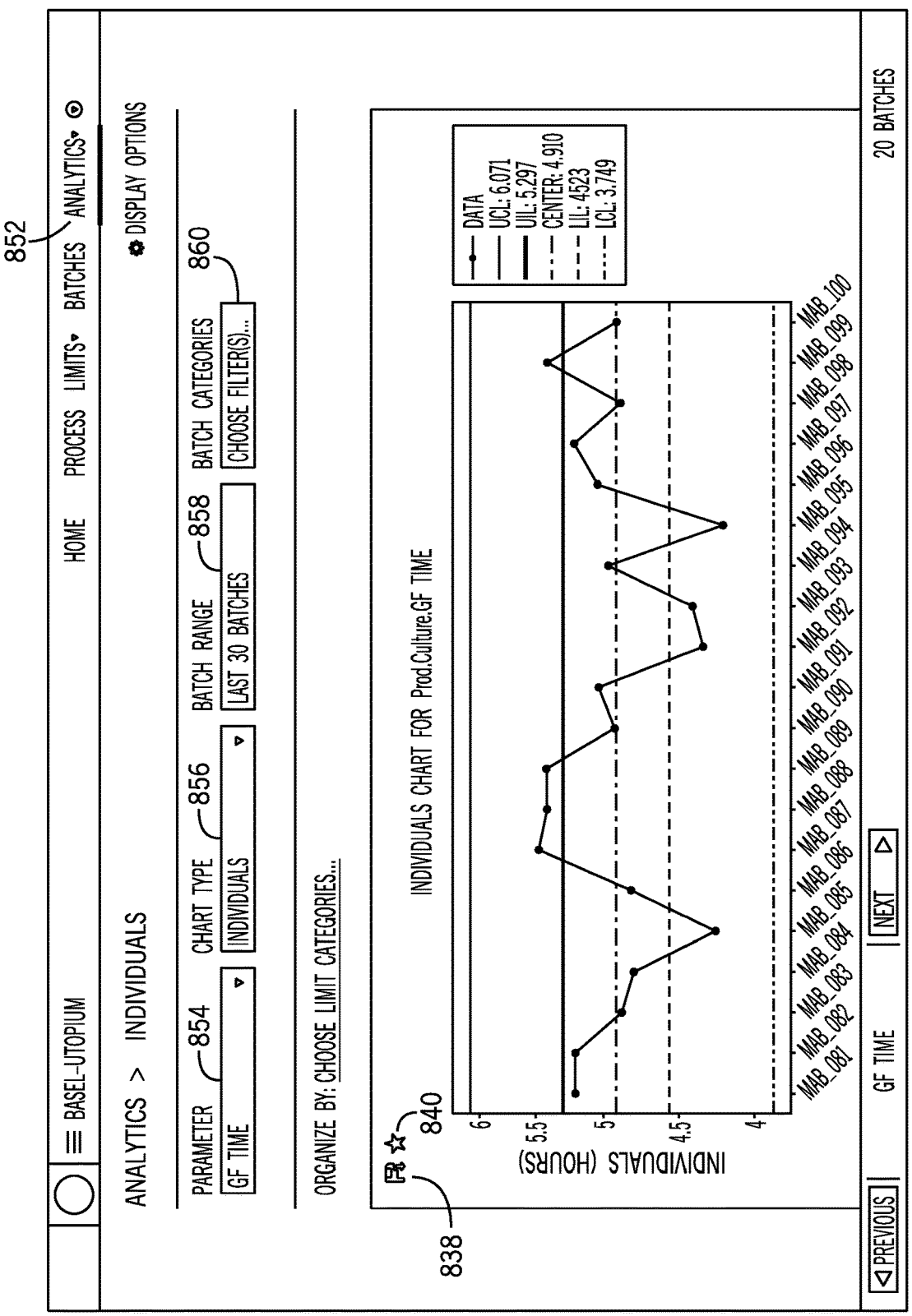
FIG. 31 illustrates a user interface displaying an analytics screen for reviewing information specific to a subscribed chart.

The home screen may also provide quick access to one or more charts. For example, a user may prefer to monitor and review charts related to particular products, sub-products, batches, sites, parameters, markets, and the like. Instead of sorting through large quantities of data (e.g., multiple products), a user can subscribe to one or more charts. For easy retrieval of subscribed charts, a user can save particular charts to a quick access location. For example, as shown in FIG. 24, the home screen 752 may include a "My Charts" tab or bar 834. A user can select an access tab 836 on the "My Charts" tab 834 to quickly view charts for particular products, sub-products, batches, sites, parameters, markets, and the like. For example, FIG. 30 shows the "My Charts" tab 834 opened by selecting the access tab 836 such that a user can view saved or frequently viewed charts. For example, as shown in FIG. 31, a user can save a chart by selecting a save icon or button 838 (in this case a disc but other icon shapes are contemplated). As shown, a user can also mark a chart as a preferred or favorite chart by selected a favorite icon or button 840 (in this case a star, but other icon shapes are contemplated). As shown in FIG. 30, the saved charts appear in the My Charts tab 834 for quick retrieval. In the example depicted, the favorite chart 846 (with the star selected) appears at the top of the list of charts in the My Charts tab 834. It is also contemplated that the server may monitor chart views and save charts with a certain number of views (e.g., over a threshold number of views) to the My Charts tab 834 for quick retrieval.

As shown in FIG. 30, the home screen 752 displays charts that a user has subscribed to. The charts displayed may be for a particular product (e.g., when the product is selected) or all products (e.g., when all products are selected). For example, as shown, all charts (e.g., all products 842) that a user has subscribed to are displayed when a toggle 844 on the home screen 752 is selected (although other selection mechanisms are contemplated). The charts may be grouped by different categories, such as by product (as shown), site, batch, parameter, market, and the like. A user can select a chart in the list to view the chart and related data. As shown in FIG. 30, the user has selected the favorite chart 846 to view the chart 848 and related data, such as limits data 850 and compliance. In this case, the favorite chart 846 is an Individuals Chart for the Product GF Time. The user can select the chart 848 to view the analytics module where the user created the chart and subscribed to the chart 848. For example, after selecting the chart 848, the analytics screen 852 is displayed, as shown in FIG. 31. The analytics screen 852 provides additional information on the parameter 854, chart type 856, batch range 858, batch categories 860, and the like. As discussed previously, a user can hover a cursor over and/or select a data point to view metadata associated with the data point (e.g., batch information).

CONCLUSION

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for validating data with a data compliance tracking system, comprising:
   receiving, by a processor, a plurality of data points from a computing element, wherein the plurality of data points correspond to data collected from a sampling of at least one parameter during a batch run of a product and includes time stamp data for each data point of the plurality of data points;
   determining, by the processor, limit information corresponding to the at least one parameter, wherein the limit information includes a first limit and a second limit that are both associated with the at least one parameter, wherein the first limit has an associated specification valid value range and wherein the second limit has an associated target valid value range that differs from the associated specification valid value range;
   storing, by the processor, the plurality of data points and the limit information;
   receiving, by the processor, an analytics request from a user device that identifies a select data point from the stored plurality of data points;
   analyzing, by the processor, the stored limit information to apply the first limit to the select data point of the stored plurality of data points, wherein the select data point has associated metadata comprising a market associated with the select data point;
   analyzing, by the processor, the stored limit information to determine the first limit associated with the market, wherein the determined first limit is applied to the select data point based on the associated specification valid value range based on the market associated with the select data point and the associated time stamp data of the select data point; and
   displaying, by the processor, an analytics output.

2. The method of claim 1, wherein the analytics output is displayed as a chart illustrating a relationship between the select data point and the applied limit.

3. The method of claim 1, wherein analyzing the stored limit information to apply the first limit to a select data point comprises:
   determining, by the processor, a time value for the select data point;
   analyzing, by the processor, the limit information to determine an applicable valid time interval for the select data point based on the time value; and
   applying, by the processor, a limit associated with the applicable valid time interval to the select data point.

4. The method of claim 1, wherein the select data point has associated metadata, the metadata further comprising a parameter and a manufacturing date, wherein analyzing the stored limit information to apply the first limit to the select data point further comprises:
   analyzing, by the processor, the stored limit information to determine one or more limits associated with the parameter; and
   analyzing, by the processor, the stored limit information to determine at least one limit of the one or more limits associated with the manufacturing date.

5. The method of claim 1, further comprising:
   receiving, by a processor, a second data point from a computing element, wherein the second data point corresponds to data collected from testing a second batch of the product;
   analyzing, by the processor, the stored limit information to apply the second limit to a second select data point; and
   displaying, by the processor, an analytics output displaying the select data points associated with their respective limits, wherein the applied limit and the second applied limit are different.

6. The method of claim 1, wherein the applied limit is the limit in effect at the time the plurality of data points were first generated.

7. The method of claim 1, wherein the applied limit has an associated limit value and the method further comprises:
   comparing, by the processor, the select data point to the associated limit value;
   determining, by the processor, the select data point violates the applied limit based on the comparison; and
   displaying, by the processing element, the violation as part of the analytics output.

8. The method of claim 7, wherein the associated limit value comprises a range of valid values having a maximum valid value and a minimum valid value.

9. The method of claim 8, wherein determining the select data point violates the applied limit comprises determining, by the processor, that the select data point falls outside the valid value range.

10. The method of claim 7, wherein the associated limit value comprises a maximum valid value, and determining the select data point violates the applied limit comprises determining, by the processor, that the select data point exceeds the maximum valid value.

11. The method of claim 7, wherein the associated limit value comprises a minimum valid value, and determining the select data point violates the applied limit comprises determining, by the processor, that the select data point falls below the minimum valid value.

12. The method of claim 1, further comprising:
   receiving, by the processor, a selection of the select data point;
   determining, by the processor, metadata associated with the select data point, wherein the metadata is related to at least one of batch identification, process, or product information for the batch run of the product; and
   displaying, by the processor, the metadata associated with the select data point.

13. The method of claim 1, further comprising:
   receiving, by the processor, an update to the limit information corresponding to the at least one parameter, wherein the updated limit information includes a new limit value associated with the at least one parameter and a new associated valid value range;
   storing, by the processor, the updated limit information in memory; and updating, by the processor, the status of the first limit to obsolete;

wherein analyzing the stored limit information to apply the first limit to a select data point comprises analyzing the stored updated limit information to apply the new limit value to the select data point.

14. The method of claim 1, further comprising:

receiving, by the processor, a quick retrieval request from a user device to retrieve one or more stored analytics outputs stored in a quick retrieval location;

displaying, by the processor, information related to the one or more stored analytics outputs;

receiving, by the processor, a selection of information related to one of the one or more stored analytics outputs; and displaying, by the processor, the analytics output related to the selected information.

15. The method of claim 1, further comprising:

determining, by the processor, the at least one data point is approved and associated with an active alert; and transmitting, by the processor, an alert notification to the user device indicating that at least one data point was received.

16. The method of claim 1, further comprising:

receiving, by a server, a data value from the batch run of the product;

determining, by the server, the data value is approved;

determining, by the server, the approved data value is associated with an active alert, wherein the active alert is related to a limit or rule associated with the data value;

evaluating, by the server, compliance of the approved data value with the limit or rule; and transmitting, by the server, an alert notification to a user indicating compliance of the approved data value with the limit or rule based on the evaluation.

17. A method of validating data with a data compliance tracking system, the method comprising:

receiving a configuration of a plurality of limits associated with a plurality of parameters, each limit having on one or more limit categories and one or more corresponding valid date ranges;

storing the plurality of limits associated with the plurality of parameters based on the one or more limit categories with their corresponding valid date ranges in a limit database;

receiving timestamped data collected from a sampling of a batch run of a product, the timestamped data measuring at least one parameter of the plurality of parameters, the batch run of the product identified in a batch identifier database;

determining a set of limits associated with the at least one parameter, wherein the set of limits includes a first limit having a specification valid value range and a second limit having a target valid value range;

storing the timestamped data as a plurality of data points associated with the at least one parameter in a data point database, each data point having a value in a unit of measure for the at least one parameter;

receiving an analytics request from a user device that identifies a selection of one or more data points from the stored plurality of data points;

generating an analysis of the selection of one or more data points based on the set of limits associated with the at least one parameter; and displaying, by the processor, an analytics output providing the generated analysis.

* * * * *